United States Patent [19]
Akita et al.

[11] Patent Number: 5,561,727
[45] Date of Patent: Oct. 1, 1996

[54] CARD-SHAPED OPTICAL DATA LINK DEVICE

[75] Inventors: Osamu Akita; Hiromi Nakanishi, both of Osaka, Japan

[73] Assignee: Sumitomo Electric Industries, Ltd., Osaka, Japan

[21] Appl. No.: 388,411

[22] Filed: Feb. 14, 1995

[30] Foreign Application Priority Data

Feb. 15, 1994 [JP] Japan .................................. 6-018566
Feb. 15, 1994 [JP] Japan .................................. 6-018573

[51] Int. Cl.⁶ .................................................. G02B 6/42
[52] U.S. Cl. .......................... 385/88; 359/163; 361/785; 385/53; 439/577
[58] Field of Search .................................. 385/53, 88, 89, 385/92, 139; 359/152–154, 163; 361/748, 760, 761, 764, 784, 785; 439/55, 65, 577

[56] References Cited

U.S. PATENT DOCUMENTS

| | | | |
|---|---|---|---|
| 4,597,631 | 7/1986 | Flores | 385/53 |
| 4,709,415 | 11/1987 | Prisco | 359/163 |
| 5,013,247 | 5/1991 | Watson | 439/55 |
| 5,259,052 | 11/1993 | Briggs et al. | 385/78 |
| 5,325,455 | 6/1994 | Henson et al. | 385/89 |
| 5,329,428 | 7/1994 | Block et al. | 361/785 |
| 5,353,364 | 10/1994 | Kurashima | 385/88 |

FOREIGN PATENT DOCUMENTS

| | | |
|---|---|---|
| 0437161 | 7/1991 | European Pat. Off. . |
| 0456298 | 11/1991 | European Pat. Off. . |
| 61-95574 | 5/1986 | Japan . |

*Primary Examiner*—John D. Lee
*Attorney, Agent, or Firm*—Cushman Darby & Cushman, L.L.P.

[57] ABSTRACT

A card-shaped optical data link device is utilized for transmitting and receiving data in optical communications using an existing card slot of a computer, electronic devices etc. The card-shaped optical data link device of the present invention comprises an electric connector, electric signal processor electrically connected to the electric connector, an optical transmission module, an optical reception module electrically connected to the electric signal processor, an optical connector for supporting the optical transmission module and the optical reception module, a frame for supporting the electric connector and the optical connector at a position opposing to the electric connector, and a pair of panels for sandwiching the frame and constituting an envelope with the frame. The electric connector, the electric signal processor, the optical transmission module, the optical reception module and the optical connector are located within the envelope.

13 Claims, 21 Drawing Sheets

F i g. 17
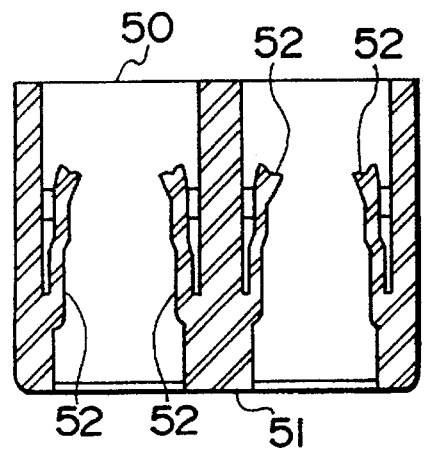
F i g. 18
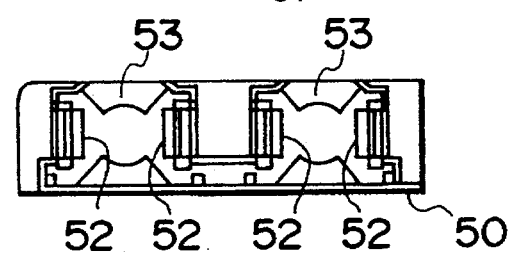
F i g. 19
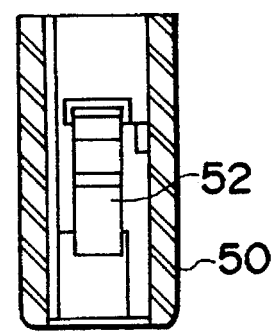
F i g. 20
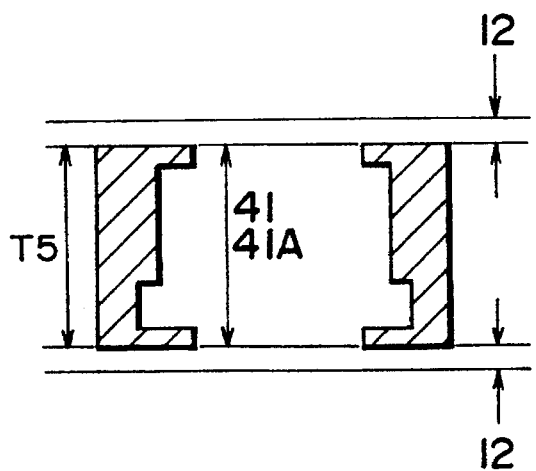

CARD-SHAPED OPTICAL DATA LINK DEVICE

BACKGROUND OF THE INVENTION

1. Field of the Invention

The present invention relates to a card-shaped optical data link device to be utilized for transmitting and receiving data in optical communications using computers, electronic devices, or measurement devices.

2. Related Background Art

In recent years, networking to personalize information with facsimiles, personal computers etc. has come into wide use.

Recent demands in high information-oriented society require large amounts of data to be readily transmitted and received in optical communications with high speed.

SUMMARY OF THE INVENTION

It is an object of the present invention to provide a card-shaped optical data link device to be utilized for transmitting and receiving data in optical communications using an existing card slot of a computer, electronic device etc.

In order to achieve the object, a first type of card-shaped optical data link device of the present invention includes an electric connector for receiving and transmitting an electric signal from and to an external environment, an electric signal processor electrically connected to the electric connector, an optical transmission module electrically connected to the electric signal processor, for converting the electric signal received from the electric signal processor into an optical signal, an optical reception module electrically connected to the electric signal processor, for converting an optical signal into an electric signal, an optical connector for supporting the optical transmission module and the optical reception module, a frame for supporting the electric connector and the optical connector at a position opposing to the electric connector, and a pair of panels for sandwiching the frame and constituting an envelope with the frame. The envelope housing the electric connector, the electric signal processor, the optical transmission module, the optical reception module and the optical connector, and the electric connector, the electric signal processor, the optical connector, the optical transmission module and the optical reception module are located all within the envelope.

Alternatively, a second type of card-shaped optical data link device includes an electric connector for receiving and transmitting an electric signal from and to an external environment, electric signal processor connected to the electric connector, an output socket electrically connected to the electric signal processor, a frame for supporting the electric connector and the optical connector at a position opposing the electric connector, a pair of panels for sandwiching the frame and constituting an envelope with the frame, the envelope housing the electric connector, the electric signal processor and the output socket, a cable connected to the output socket to transmit an electric signal from and to the electric signal processor, an optical transmission module for converting the electric signal received from the electric signal processor through the cable into an optical signal, an optical reception module for converting an optical signal into an electric signal and sending the electric signal to the electric signal processor through the cable, an optical connector for supporting the optical transmission module and the optical reception module, and a housing for storing the optical connector, the optical transmission module, and the optical reception module.

Alternatively, a third type of card-shaped optical data link device includes an electric connector for receiving and transmitting an electric signal from and to an external environment, electric signal processor electrically connected to the electric connector, an optical transmission module electrically connected to the electric signal processor, for converting the electric signal received from the electric signal processor into an optical signal, an optical reception module electrically connected to the electric signal processor, for converting an optical signal into an electric signal, a transmission optical fiber having a first end fitted into the optical transmission module, a reception optical fiber having a first end fitted into the optical reception module, a frame for supporting the electric connector, and the optical transmission module and the optical reception module at a position opposing the electric connector, and a pair of panels for sandwiching the frame and constituting an envelope with the frame, the envelope housing the electric connector, the electric signal processor, the optical transmission module, and the optical reception module, and the electric connector, the electric signal processor, the optical transmission module and the optical reception module are located within the envelope.

According to the first type of card-shaped optical data link device of the present invention, the card-shaped optical data link device is formed in card shape with the panel, frame and panel, so that the thickness of the card-shaped optical data link device is thin. Therefore, the card-shaped optical data link device is readily inserted into, e.g., an existing card slot of a computer to transmit data in optical communications.

Further, cuts may be formed on a surface to be covered with the panel to make the card-shaped optical data link device thin.

According to the second type of card-shaped optical data link device, the portion which is to be inserted into, e.g., an existing card slot of a computer is made thin, and the housing for housing the optical transmission and reception modules is separately formed. Therefore, the second type card-shaped optical data link device can also be readily inserted into, e.g., an existing card slot of a computer to transmit data in optical communications.

According to the third type of card-shaped optical data link device, the portion which is to be inserted into, e.g., an existing card slot of a computer is made thin, so that the third type card-shaped optical data link device can also be readily inserted into, e.g., an existing card slot of a computer to transmit data in optical communications. Further, the transmission optical fiber and the reception optical fiber are rigidly fitted into the optical transmission module and the optical reception module, respectively. Accordingly, additional equipment to hold the optical fibers is not needed.

An existing card slot of a computer, for example, is conventionally used for communication cards which output and receive electric signals. The communication cards are standardized by JEIDA (Japanese Electronic Industry Development Association). In the guideline ver. 4.1 by JEIDA, there are type I and type II communication cards. Their standards are shown in Table 1.

TABLE 1

| Type | Length | Width | Thickness | Body Thickness |
|---|---|---|---|---|
| I | 85.6 ± 0.2 | 54.0 ± 0.1 | 3.3 ± 0.1 | 3.3 ± 0.2 |
| II | 85.6 ± 0.2 | 54.0 ± 0.1 | 3.3 ± 0.1 | below 5.0, t ± 0.2 |

[unit: mm]

In Table 1, t (arbitrary size) is a normal size of the body thickness of the card.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

FIGS. 17, 18 and 19 are views showing another optical connector of the card-shaped optical data link device according to the first embodiment of the present invention.

FIG. 20 is a side view showing an optical connector with cuts.

DETAILED DESCRIPTION OF THE PREFERRED EMBODIMENTS

Figure 1:
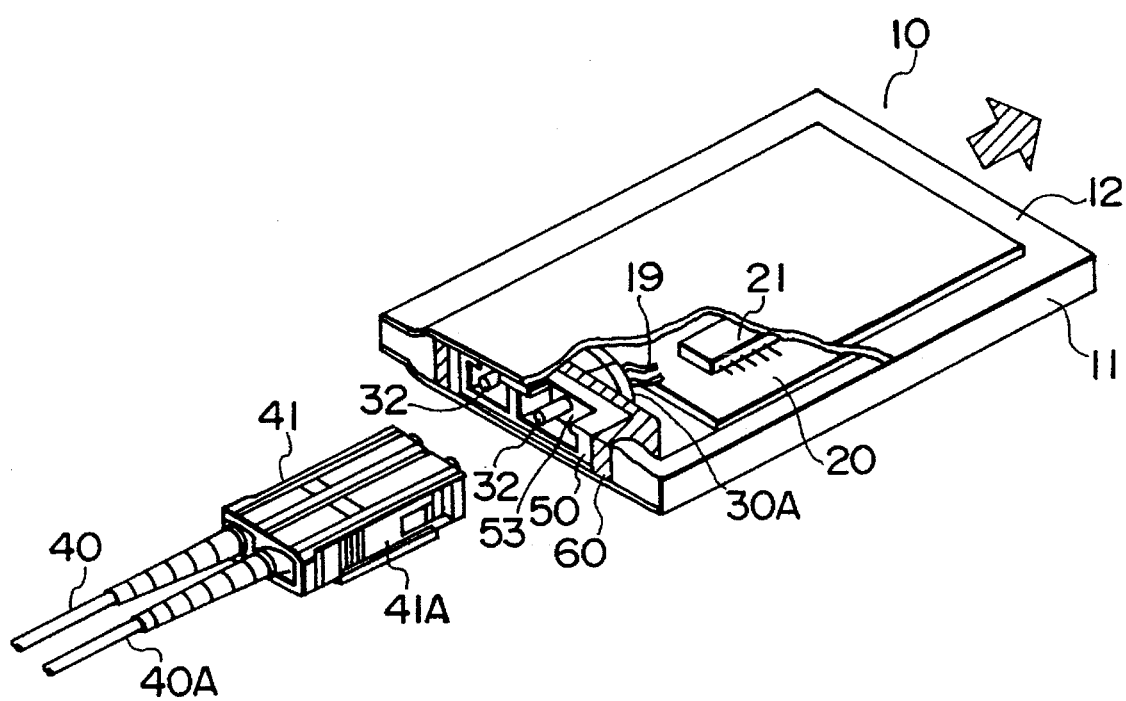
FIG. 1 is a perspective view showing a first type of card-shaped optical data link device according to the first embodiment of the present invention, with a connector plug being inserted.
Figure 2:
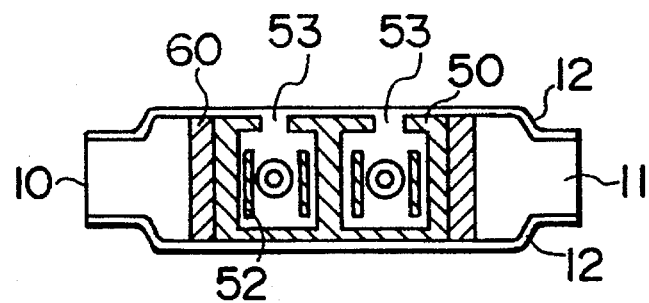
FIG. 2 is a sectional view showing an optical connector of the card-shaped optical data link device of the first embodiment.

The embodiments of the present invention will be described with reference to the accompanying drawings.

The same components are represented by the same reference numerals and the repetitive description on the same components is omitted.

FIG. 1 shows a first type card-shaped optical data link device of the first embodiment. As shown in FIG. 1, there are an electric circuit board 20, an optical transmission module, an optical reception module 30A and an optical connector 50, in a housing 10. An MU-optical transmission connector plug 41 having a transmission optical fiber 40 is fitted into the optical connector 50 so that the optical transmission module is optically coupled with the transmission optical fiber 40, and an MU-optical reception connector plug 41A having a reception optical fiber 40A is fitted into the optical connector 50 so that the optical reception module 30A is optically coupled with the reception optical fiber 40A.

Figure 4:
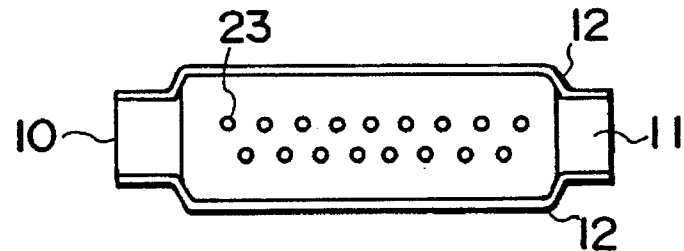
FIG. 4 is a sectional view showing an electric connector of the card-shaped optical data link device of the first embodiment.
Figure 5:
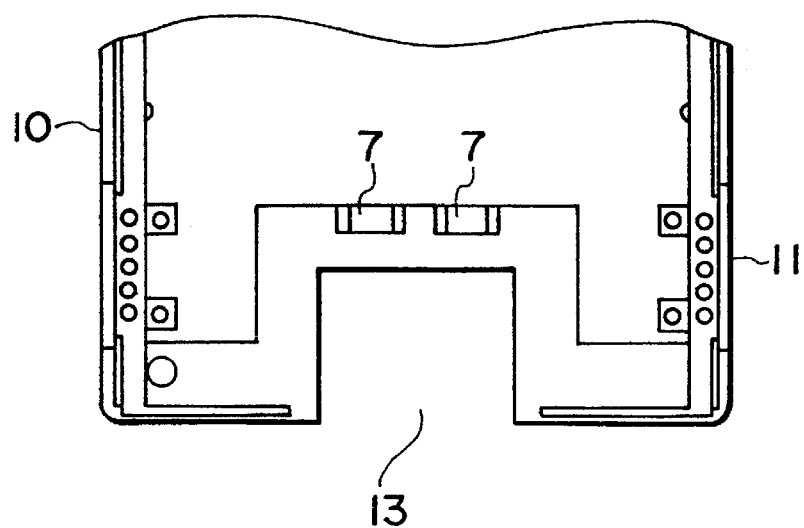
FIGS. 5 and 6 are views showing a housing of the optical data link of the first embodiment.
Figure 6:
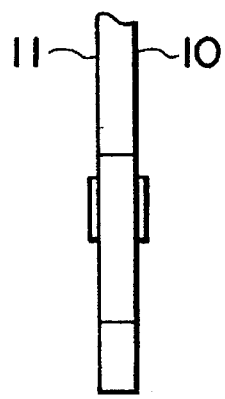

The housing 10 comprises a flat rectangular frame 11 and metal panels 12 sandwiching the frame 11. The housing 10 is formed thin in conformity with the type II communication card. This is because the type II communication card is superior in processability since it is thicker than the type I communication card. The frame 11, as shown in FIGS. 2 through 6, is a flat rectangular frame with one open side and has an attaching space 13 at a center of a short side to fix the optical connector 50. The frame 11 supports the electric connector 22 at another short side. FIG. 5 shows one example of the frame 11. When the optical connector 50 is fixed at the attaching space 13 of the frame 11 shown in FIG. 5, the optical transmission and reception modules 30 and 30A are inserted into respective holes 7 of the frame 11 from the electric connector side and inserted into the optical connector 50. The thin flat rectangular metal panels 12, as shown in FIG. 1, sandwich the frame 11 to efficiently protect and shield the electronic circuit board 20, the electric connector 22, the optical transmission module 30, the optical reception module 30A, and the optical connector 50. Accordingly, the housing 10 is formed in conformity with the type II communication card which has the length of 85.6±0.2 mm, the width of 54.0±0.1 mm, the coupling portion thickness of 3.3±0.1, and the body thickness of 5.0 mm or below.

In the first embodiment, the metal panels 12 efficiently protect and shield the electronic circuit board 20, the electric connector 22, the optical transmission module 30, the optical reception module 30A and the optical connector 50 but the metal panels 12 may protect and shield the whole portion or a part of the electronic circuit board 20, the electric connector 22, the optical transmission module 30, the optical reception module 30A and the optical connector 50. Further, the panels 12 may be formed with engineering plastic or another material if the material shows the same functions and effects. Furthermore, in the first embodiment, the housing 10 is formed in conformity with the type II communication card but it may be formed in conformity with the type I communication card, which also shows the same functions and effects.

The electronic circuit board (electric signal processor) 20 is formed thin, flat rectangular. ICs with a plurality of pins are mounted on the surface of the electronic circuit board 20 which is housed in the housing 10. The electric connector 22 which is a female connector as shown in FIG. 4 is placed at one short side of the electronic circuit board 20.

Figure 7:
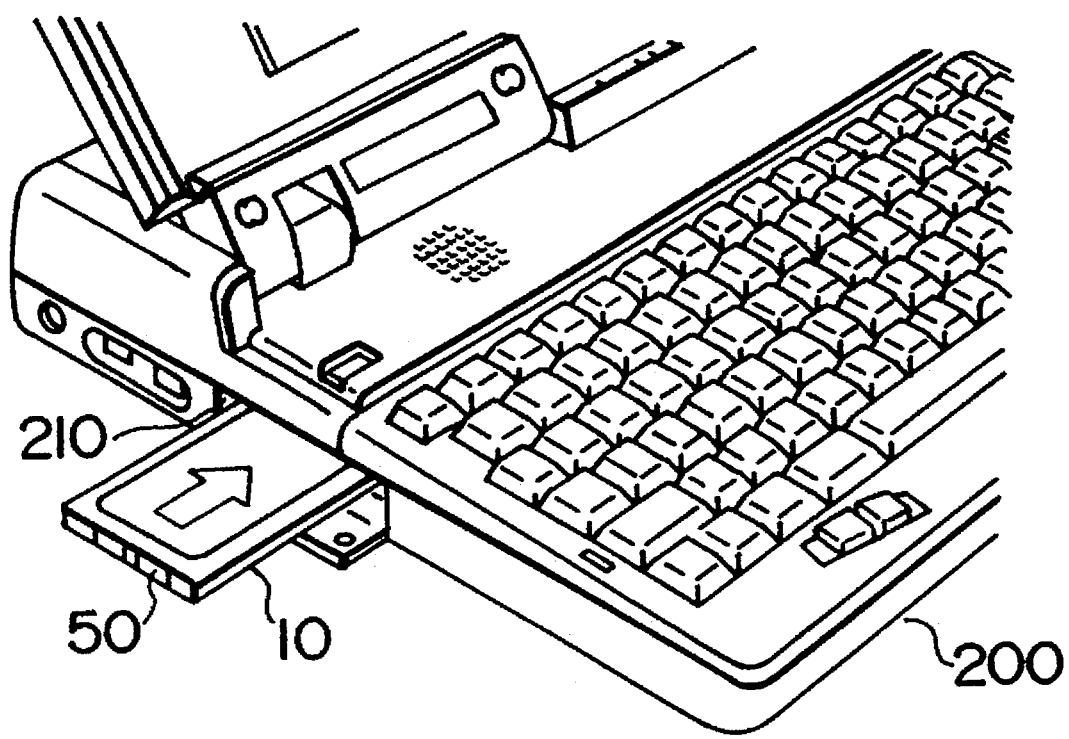
FIG. 7 is a perspective view showing a card-shaped optical data link device being inserted into a computer.
Figure 8:
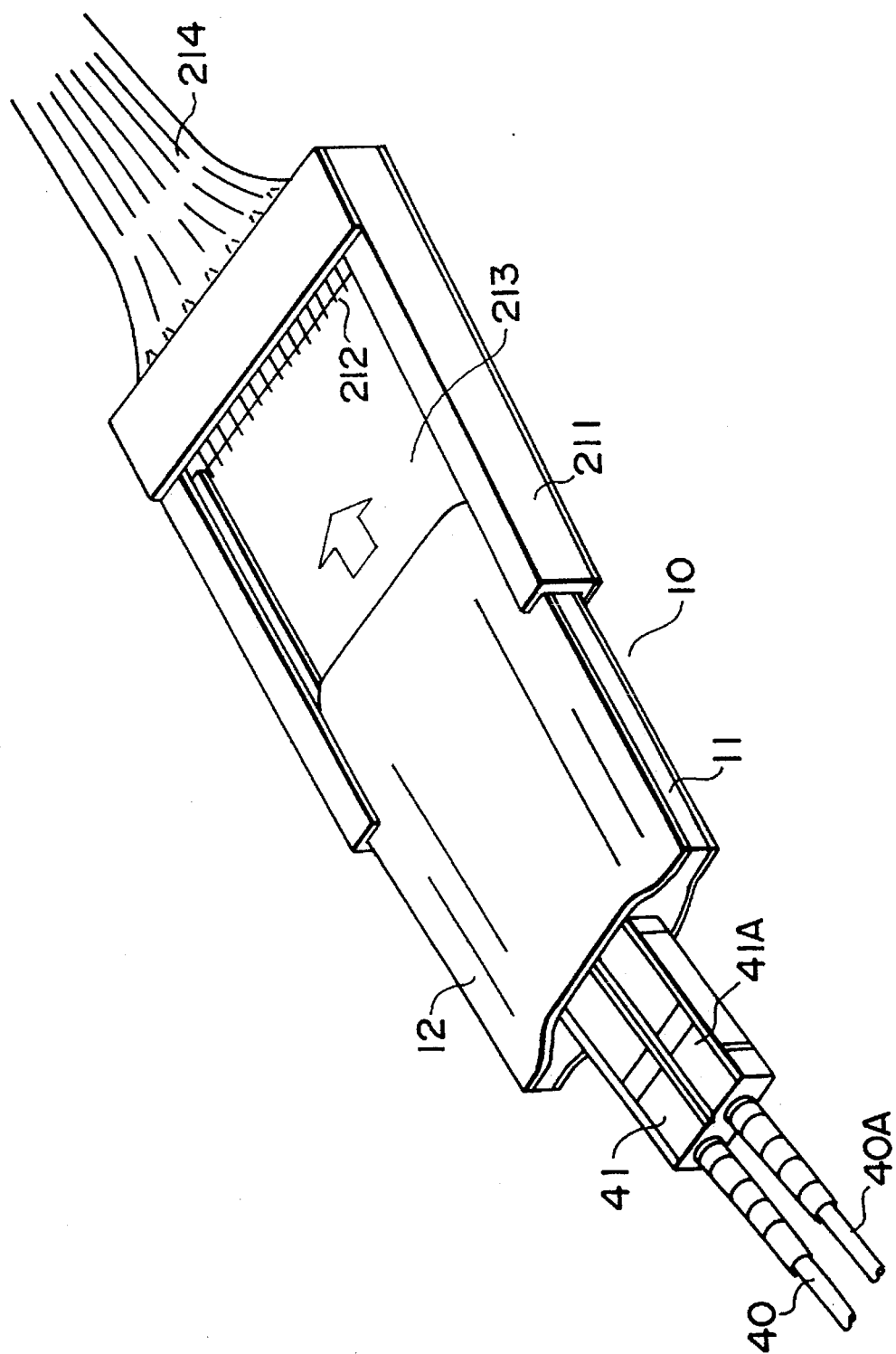
FIG. 8 is a perspective view showing a card-shaped optical data link device being inserted into a slot of the computer.

As shown in FIG. 7, the card-shaped optical data link device is inserted into a card slot 210 of a computer 200 to transmit data between the computer 200 and external devices. FIG. 8 shows the card-shaped optical data link device being inserted into the card slot 210. There is a frame 211 for guiding the card-shaped optical data link device inside the card slot 210. As the card-shaped optical data link device is inserted into the card slot 210, it moves on the frame 211 to the inside of the slot 210 and the electric connector 22 is connected with pins 212 and rests on the board 213. Then, the data are transmitted between the card-shaped optical data link device and the computer 200 through a cable 214. The electronic circuit board 20 has a function to process electric signals transmitted with the computer 200 upon the connection of the electric connector 22 and the pins 212.

Figure 3:
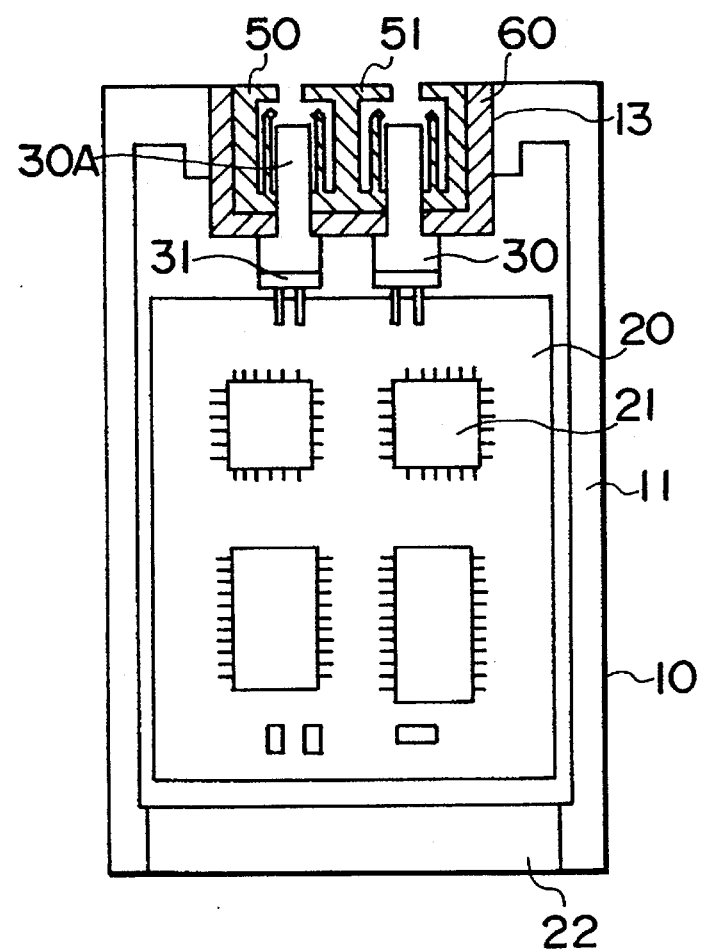
FIG. 3 is a top view showing the card-shaped optical data link device of the first embodiment.

In this embodiment, the electronic circuit board 20 shown in FIG. 3 is used but it is not limited to this structure and shape if it shows the same functions and effects. Further, in the present embodiment, the optical communication means is a computer but it is apparent that other devices could also be used as long as they can be used in optical communications, for example, facsimiles, measuring apparatus, optical devices, electrical communication device etc.

Figure 9:
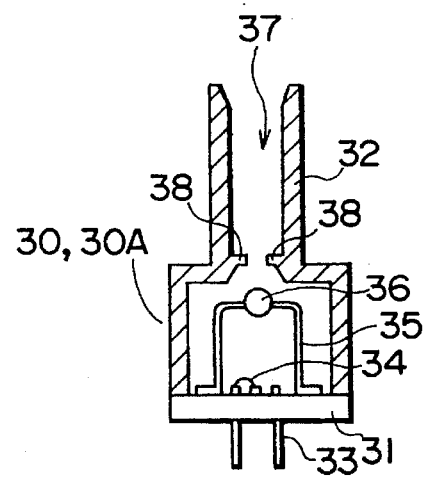
FIG. 9 is a sectional view showing an optical transmission module and an optical reception optical module.

FIG. 9 shows the optical transmission module 30 utilized in the present embodiment. As shown in FIG. 9, the optical transmission module 30 has a cylindrical sleeve 32 with both ends open and a main body having two flat surfaces. The main body is fixed on a backside of a substantially circular device package 31. The optical transmission module 30 is housed in the housing 10 and connected to the electric connector with a wire 19. The optical transmission module 30 has a function to convert an electric signal transmitted from the electronic circuit board 20 into an optical signal and to transmit the optical signal to the external device. There are plural lead pins 33 formed on the front side of the device package 31, and the lead pins 33 are electrically connected to the electronic circuit board 20 through wires 19. An LED for converting an electric signal into an optical signal, or an optical device 34 such as an LD, as well as a cap 35, is mounted on the center portion of the backside of the device package 31. The cap 35 has a lens 36 fixed at the center which is to optically couple the optical device 34 with the optical transmission fiber 40 supported by a ferrule 42 which is described later when the ferrule 42 is inserted into the module 30. A precision sleeve 37 for accurately supporting the ferrule 42 having the transmission optical fiber 40 is formed with high accuracy at the inner surface of the sleeve 32. Also, there are claws 38 for stopping the ferrule 42 at the inner surface of the sleeve 32. When the ferrule 42 is inserted into the sleeve 37 of the optical reception module 30, the optical fiber 40 supported by the ferrule 42 receives light emitted from the optical device 34 through the lens 36.

It should be noted that in this embodiment, the optical reception module 30 shown in FIG. 9 is used but it is not limited to this structure and shape if it has the same function. Further, it is apparent that the sleeve 32 shown in FIG. 9 can be replaced, e.g., with a sleeve having a slit in an extending direction.

Figure 10:
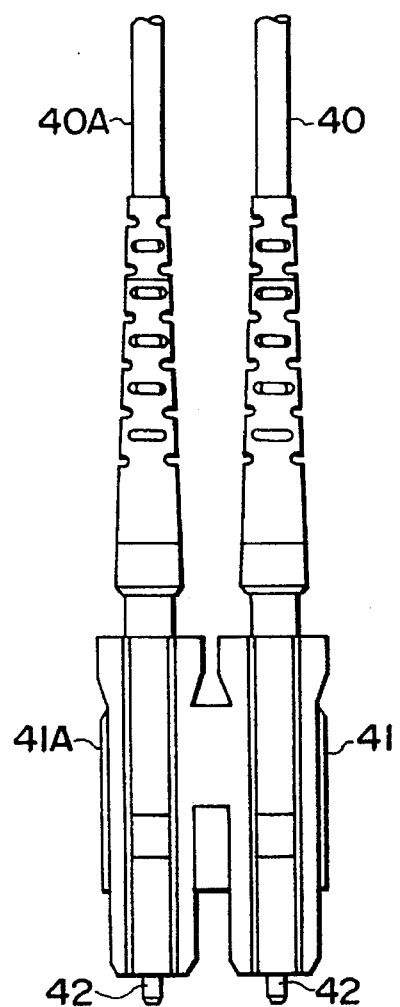
FIG. 10 is a top view showing a transmission connector plug and a reception connector plug of the card-shaped optical data link device.
Figure 11:
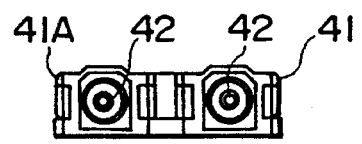
FIG. 11 is a side view showing the transmission connector plug and the reception connector plug of the card-shaped optical data link device.
Figure 12:
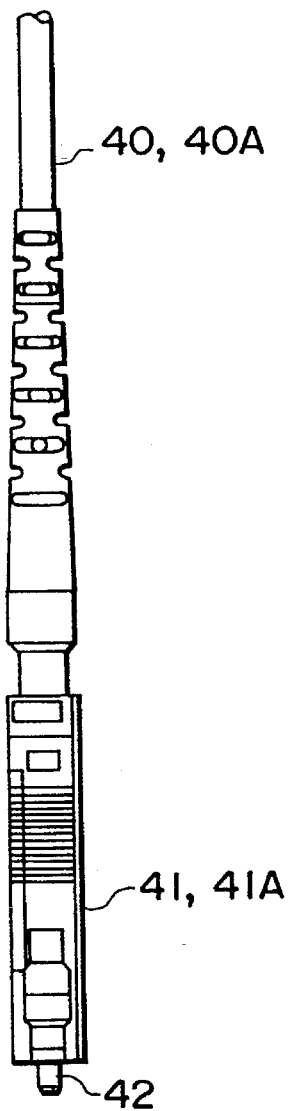
FIG. 12 is a side view showing the transmission connector plug and the reception connector plug of the card-shaped optical data link device with a protective cap.
Figure 12:
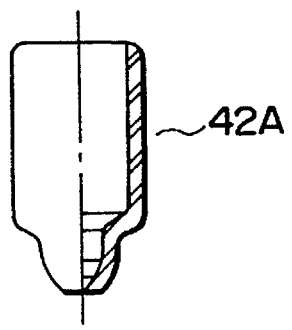

FIG. 10 shows a connector plug utilized in the present embodiment, and FIG. 11 shows a front view of the connector plug, and FIG. 12 shows a side view of the connector plug. As shown in FIG. 10, the transmission optical fiber 40 is coated with a coating layer to be protected, and an MU-optical transmission connector plug 41 is fitted on the tip of the optical fiber 40. The MU-optical transmission connector plug 41 is integrally formed with the Mu-optical reception connector plug 41A by its side. The cylindrical ferrule 42 is fitted on the tip of the transmission optical fiber 40. When this ferrule 42 is inserted into the precision sleeve 37, the ferrule 42 prevents the imperfect alignment of the transmission optical fiber 40. The MU-transmission optical connector plug 41 utilized in the present embodiment is formed 4.4 mm thick while the conventional FDDI-, SC-, FC-, and ST-transmission optical connector plugs are formed 5 mm thick or above. The optical connector plug 41 is a receptacle type plug which is removable, and its shape is an elongated prism. The MU-optical connector plug is superior in small size, light weight, high performance, high reliability, low cost, which has been widely used. The MU-transmission optical connector plug 41 is used in the present embodiment because it is able to be inserted into the optical connector 50 of the housing 10 without hinderance owning to its 4.4 mm thickness.

It should be noted that the transmission optical fiber 40 is used in the present embodiment but any kind of transmission optical fiber may be used if the fiber has a function of transmitting light. The optical transmission connector plug 41 is not limited to the MU-connector plug but other kinds of optical transmission connector plug 41 may be used. For example, Product No. HMUA-P2-H1, No. HMUA-P2-H2, No. HMUA-2P2-H1, No. HMUA-2P2-H2, product of HIROSE DENKI may be used.

The optical reception module 30A has the same configuration as the optical transmission module 30 shown in FIG. 9 except that the optical device 34 is a pin photodiode for receiving light. When the ferrule 42 is inserted into the sleeve 37 of the optical reception module 30A, the optical device 34 receives light emerging from the optical fiber 40A supported by the ferrule 42.

It should be noted that, in this embodiment, the optical reception module 30A shown in FIG. 9 is used but it is not limited to this structure and shape if it has the same function. Further, it is apparent that the sleeve 32 shown in FIG. 9 can be replaced, e.g., with a sleeve having a slit in an extending direction.

As shown in FIG. 10, the reception optical fiber 40A is coated with a coating layer to be protected, and an MU-optical reception connector plug 41A is fitted on the tip of the optical fiber 40A. The MU-optical reception connector plug 41A is integrally formed with the Mu-optical reception connector plug 41 by its side. The cylindrical ferrule 42 is fitted on the tip of the reception optical fiber 40A. When this ferrule 42 is inserted into the precision sleeve 37, the ferrule 42 prevents the imperfect alignment of the reception optical fiber 40A. The MU-reception optical connector plug 41A utilized in the present embodiment is formed 4.4 mm thick while the conventional FDDI-, SC-, FC-, and ST-reception optical connector plugs are formed 5 mm thick or above. Also, the optical connector plug 41A is a receptacle type plug which is removable, and its shape is an elongated prism. The MU-optical connector plug is superior in small size, light weight, high performance, high reliability, low cost, which has been widely used. The MU-reception optical connector plug 41A is used in the present embodiment because it is able to be inserted into the optical connector 50 of the housing 10 without hinderance owning to its 4.4 mm thickness.

It should be noted that the reception optical fiber 40A is used in the present embodiment but any kinds of reception optical fibers may be used if the fiber has a function of transmitting light. The optical reception connector plug 41A is not limited to the MU-connector plug but other kinds of optical reception connector plug 41 may be used. For example, Product No. HMUA-P2-H1, No. HMUA-P2-H2, No. HMUA-2P2-H1, No. HMUA-2P2-H2, product of HIROSE DENKI may be used. Reference numeral 42A shown in FIG. 12 is a protective cap for protecting the tips of the connector plugs 41 and 41A.

The optical connector 50 made of engineering plastic has a box shape with an open front side, as shown in FIGS. 2 and 3 and FIGS. 13 and 14. The optical connector 50 together with a block 60 made of Al or plastic is fitted in the attaching space 13 formed in the frame 11 and housed and protected in the housing 10. The optical connector 50 supports the optical transmission module 30 and the optical reception module 30A horizontally, and the MU-optical transmission connector plug 41 and the MU-optical transmission connector plug 41A are inserted into the optical connector 50. There is a division plate 51 integrally molded in the middle of the optical connector 50 to divide the internal space into two adaptor spaces. Also, there are a pair of holes (not shown) at the back side of the optical connector 50 horizontally. The sleeves 32 of the optical transmission and reception modules 30, 30A are inserted into the respective holes. There are also one pair of holding strips 52 projecting to the front side of the optical connector 50 in each adaptor space of the optical connector 50. These two pairs of the holding strips 52 latch the optical connector plugs 41 and 41A when the optical connector plugs 41 and 41A are fitted into the optical connector 50. Cuts 53 are formed on the upper surface (surface to be covered with the panel 12) of the optical connector 50 from the front side to the back side. These cuts 53 contribute to making the thin optical connector.

Figure 15:
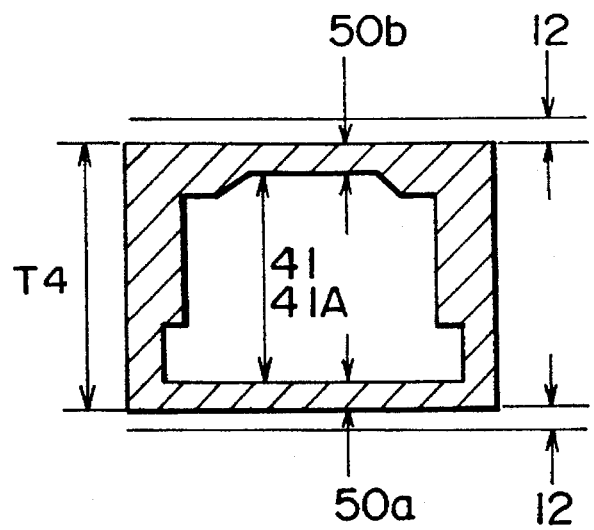
FIG. 15 is a side view showing an optical connector without a cut.
Figure 16:
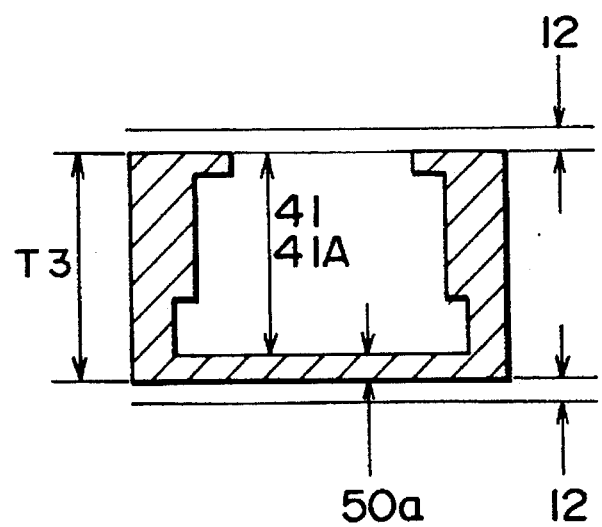
FIG. 16 is a side view showing an optical connector with a cut.

FIG. 15 shows the cross section of the optical connector without a cut and FIG. 16 shows the cross section of the optical connector with a cut. The optical connector 50 has a box shape so as to surround the MU-optical transmission connector plug 41 and the optical reception connector plug 41A when they are inserted therein. The optical connector 50 needs to protect these plugs, so that the thickness of the upper surface and the lower surface needs at least 0.3 mm in a view of mechanical integrity.

The thickness T4 of the optical connector without the cut shown in FIG. 15 is the thickness of the space for the optical connector plug which is equal to the thickness of the plug 41 or 41A, 4.4 mm+the thickness of the lower surface 50a, 0.3 mm+the thickness of the upper surface 50b, 0.3 mm+the thickness of one pair of the metal panels 12, 0.15 mm×2=5.3 mm. On the other hand, the thickness T3 of the optical connector with the cut shown in FIG. 16 is the thickness of the space for the plug, 4.4 mm+the thickness of the lower surface 50a, 0.3 mm+the thickness of the metal panels 12, 0.15 mm×2=5.0 mm. As apparent from these figures, the optical connector 50 with a cut is thinner the optical connector 50 without a cut, and it is suitable for the card-shaped optical data link device formed in conformity with the type II communication card. In the optical connector with a cut, the upper surface of the optical connector also has 0.3 mm in thickness, so that the optical connector with cut sufficiently protects the plugs 41, 41A.

Figure 13:
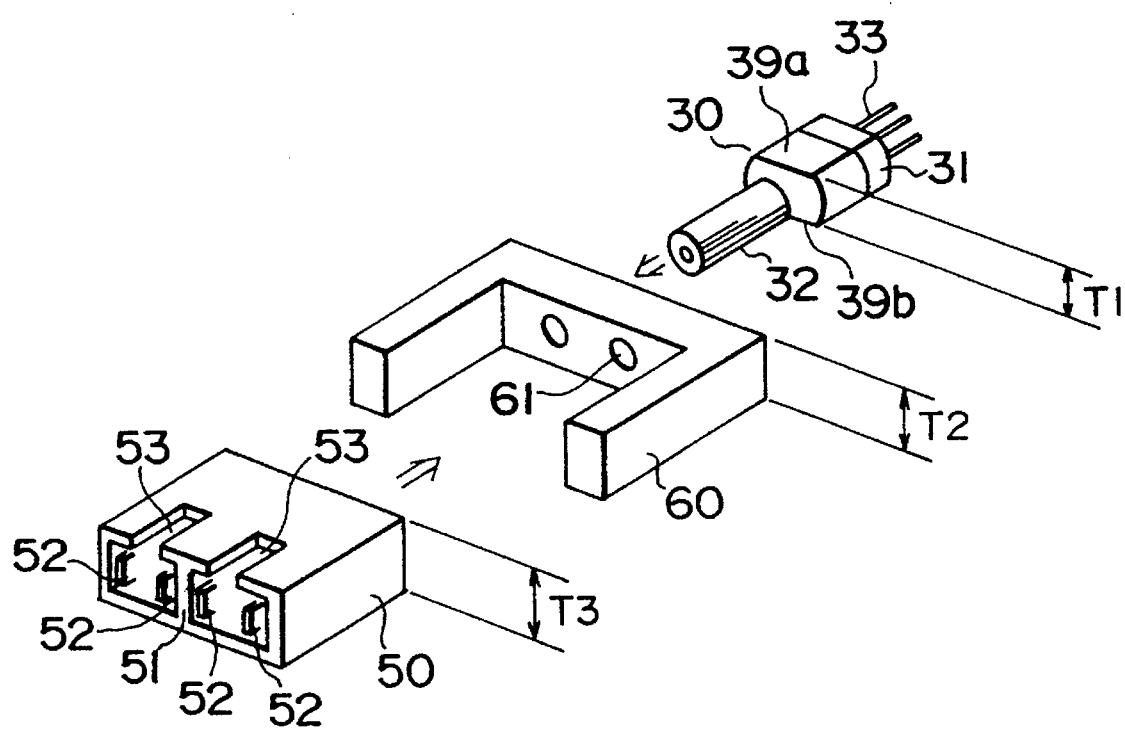
FIG. 13 is a perspective view showing assembling of the optical connector and the optical transmission and reception modules of the card-shaped optical data link device of the first embodiment.

The optical reception module 30A and the optical transmission module 30 have the shape shown in FIG. 13 that the sleeve 32 is cylindrical and the main body has the flat upper surface 39a and the flat lower surface 39b.

Figure 14:
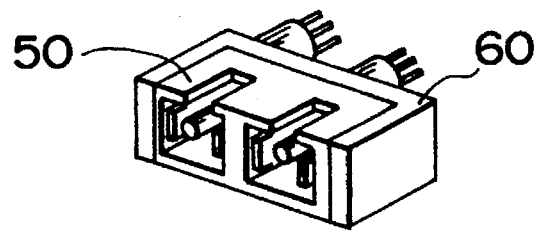
FIG. 14 is a perspective view showing a completed optical connector and the optical transmission and reception modules.

The block 60 shown in FIGS. 13 and 14 is formed substantially U-shape and made of metal, plastic etc. The block 60 is placed in the attaching spacing 13 of the frame 11, e.g., with an adhesive. The optical connector 50 is fixed in the block 60 by laser welding or an adhesive. The block 60 has one pair of holes 61 at the back surface which is to be attached to the back surface of the optical connector 50. The sleeves 32 of the optical transmission and reception modules 30 and 30A are inserted into the respective holes 61. As shown in FIG. 13, the thickness T2 of the block 60 is substantially the same as the thickness T3 of the optical connector 50, and the thickness T1 of the main body of the optical module 30 between the two flat surfaces 39a, 39b is less than or equal to the thickness T3 of the connector 50. The thickness T3 of the connector 50 is less than or equal to the thickness of the frame 11.

In the present embodiment, the optical connector 50 shown in FIGS. 2 and 3 or FIGS. 13 and 14 is used, but another optical connector having the different shape and configuration, e.g., shown in FIGS. 17–19, may be used therefor if it has the same function and effect. FIG. 17 shows a top view of the optical connector, and FIG. 18 shows a front view of the optical connector, and FIG. 19 shows a side view of the optical connector. As shown in FIGS. 17 to 19, a pair of holding stripes 52 are formed on the internal side walls of the optical connector 50. Further, also in the present embodiment, the block 60 and the optical connector 50 are formed separately but the block 60 may be integrally molded with the optical connector 50, which also shows the same function and effect. Furthermore, cuts may also be formed on the lower surface of the optical connector 50 as shown in FIG. 20 from the front side to the back side in addition to the cuts on the upper surface. The thickness T5 of the optical connector 50 with cuts on both upper and lower surfaces shown in FIG. 20 is the thickness of the space for the optical connector plug which is equal to the thickness of the plug 41 or 41A, 4.4 mm+the thickness of one pair of the metal panels 12, 0.15 mm×2=4.7 mm. The thickness of the optical connector 50 with cuts on both upper and lower surfaces is thinner than that of the optical connector 50 with the cuts on the upper surface, so that with the use of the optical connector 50 with the cuts on both upper and lower surfaces, the card-shaped optical data link device can be made 4.7 mm thick. In this case, the upper and lower surfaces of the optical connector 50 also have 0.3 mm in thickness, so that the optical connector 50 with cuts on both upper and lower surfaces sufficiently protects the plugs 41, 41A.

The card-shaped optical data link device with the above-described configuration is inserted into the card slot 210 of the personal computer 200 as shown in FIG. 7, and the optical transmission and reception connector plugs 41 and 41A are fitted into the optical connector 50 when data is transmitted between the computer and the external device in optical communications.

When the data is transmitted from the computer 200 to the external device in optical communications, an electric signal is sent from the computer 200 to the electronic circuit board 20 through the electric connector 22, and the electronic circuit board 20 processes the electric signal. The processed electric signal is sent to the optical transmission module 30. Then, the optical device 34 such as an LED converts the electric signal into the optical signal, and the optical signal is transmitted to the external device through the transmission optical fiber 40.

On the other hand, when data is received from the external device, an optical signal is sent from the external device to the optical reception module 30A through the reception optical fiber 40A. Then, the optical device 34 such as a pin photodiode of the optical reception module 30A converts the optical signal into the electric signal and the electric signal is sent to the electronic circuit board 20. The electronic circuit board 20 processes the electric signal, and the processed electric signal is sent to the computer through the electric connector 22 which is connected to the pins 212 in the slot 210 of the computer 200.

According to the above-described configuration of the card-shaped optical data link device, the housing 10 is formed thin in conformity with the type II communication card standardized by JEIDA, so that the existing card slot of the computer, for example, can be used to transmit and receive data in optical communication. Further, the optical connector 50 has the cuts 53 on the upper surface thereof from the front side to the back side, which makes the optical connector 50 thin. Consequently, the thickness of the optical connector 50 is made 5 mm or below. Furthermore, the optical connector 50, the optical transmission module 30 and the optical reception module 30A are all stored in the housing 10, so that the reduction of the number of parts, the improvement of the work efficiency upon the installation and the reduction of the size accuracy of the parts are attained, compared with the case of assembling separate parts.

Further, the card-shaped optical data link device is expected to be utilized in LAN. The frame 11 are sandwiched between the metal panels 12, so that the electronic circuit board 20, the electric connector 22, the optical transmission module 30, the optical reception module 30A and the optical connector 50 are efficiently protected and shield from the external environment. The precision sleeves 37 are formed at the sleeves 32 of the optical transmission module 30 and the optical reception module 30A, which largely suppress optical losses. Since the thickness of the optical transmission connector plug 41 and the optical reception connector plug 41A is 4.4 mm, they are readily fitted into the optical connector 50 to transmit and receive data in optical communications. The optical connector 50 holds the optical transmission module 30 and the optical reception module 30A horizontally, which means the optical transmission module 30 is placed by the side of the optical reception module 30A in the direction of the short side of the frame 11, so that the housing 10 will not be thick. Since the pairs of the holding strips 52 latch the optical connector plugs 41, 41A, the imperfect alignment of the optical transmission and reception modules 30 and 30A with the transmission and reception optical fibers 40 and 40A which are supported by the optical connector plugs 41 and 41A is prevented.

Next, the second embodiment of the card-shaped optical data link device which belongs to the first type card-shaped optical data link device will be described.

Figure 21:
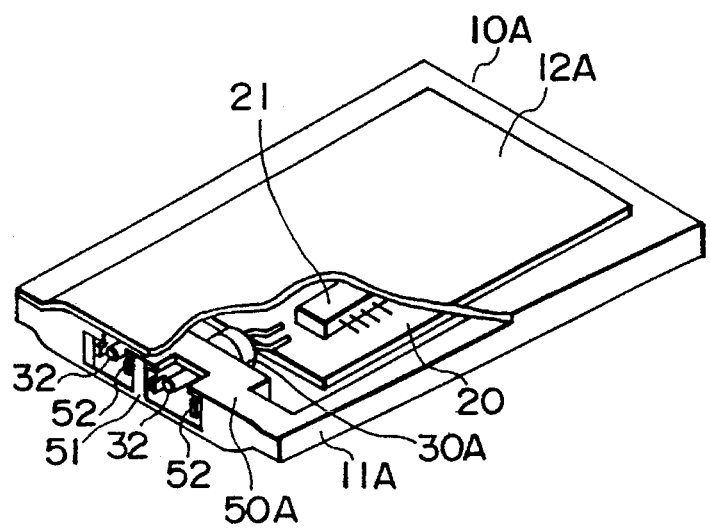
FIG. 21 is a perspective view showing a first type card-shaped optical data link device of the second embodiment.
Figure 22:
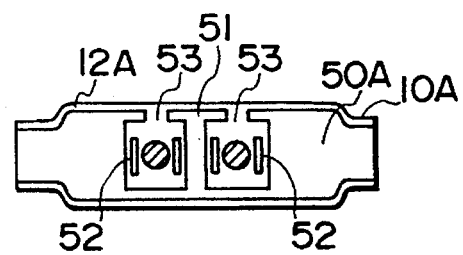
FIG. 22 is a side view showing an optical connector of the first type card-shaped optical data link device of the second embodiment.
Figure 23:
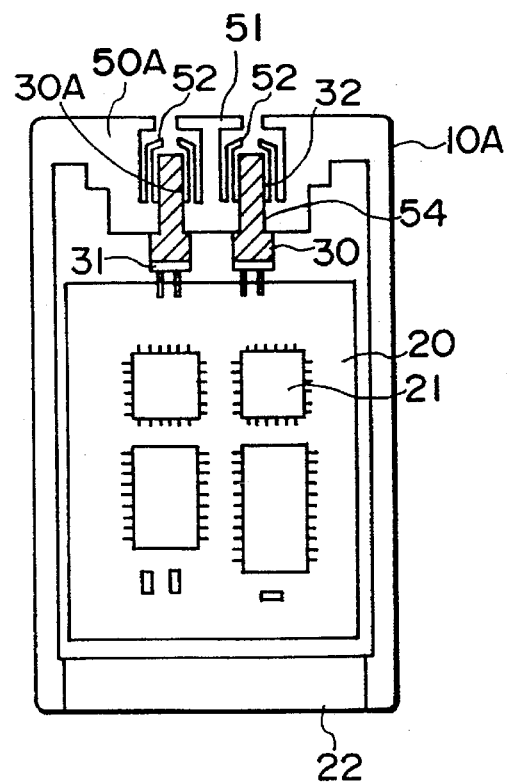
FIG. 23 is a top view showing the first type card-shaped optical data link device of the second embodiment.

FIG. 21 shows a perspective view of the card-shaped optical data link device of the second embodiment, and FIG. 22 shows a front view of an optical connector of the card-shaped optical data link device, and FIG. 23 shows a top view of the card-shaped optical data link device. The card-shaped optical data link device of the second embodiment is different from the card-shaped optical data link device of the first embodiment in that the frame 11A and the optical connector 50A are integrally molded from a plastic such as PPS, PES and a liquid crystal polymer.

Figure 24:
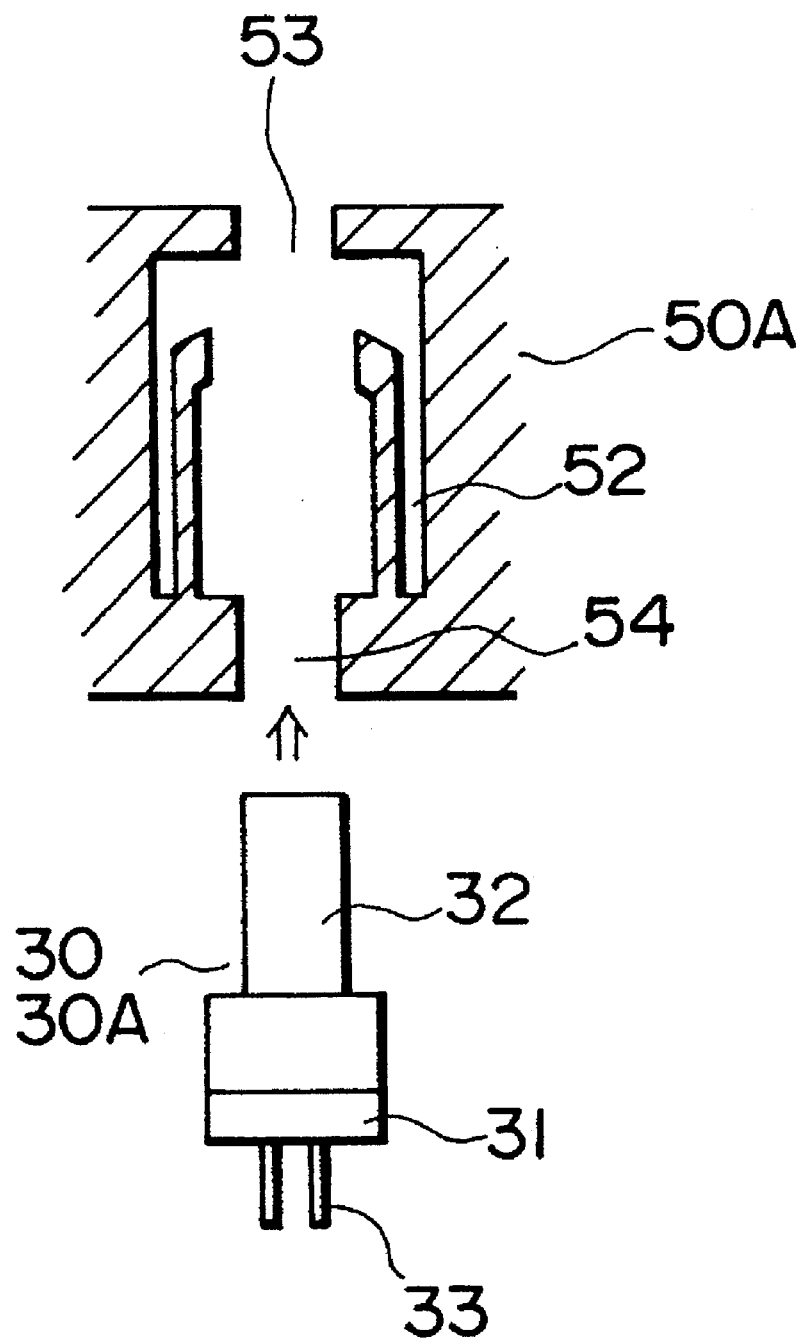
FIG. 24 is a sectional view showing another optical connector with an optical module being inserted.

The integrally formed optical connector 50A has a pair of holes 54 horizontally to which an optical transmission module 30 and an optical reception module 30A are inserted. As shown in FIG. 24, the optical module 30 or 30A is inserted into the hole 54. There are a pair of holding stripes 52 for latching the optical connector plug 41 or 41A when they are fitted into the optical connector 50A.

The engineering plastic is used in molding of the housing 10A and the optical connector 50A. This is because the engineering plastic is superior in heat resistance and in mechanical integrity. The remaining portions have the same configurations as in the first embodiment.

Also in the second embodiment, the same function and effect as in the first embodiment are attained. The optical transmission and reception modules 30 and 30A in which the optical device 34 and the sleeve 32 are aligned and assembled beforehand are horizontally inserted into the holes 54 of the frame 11A which constitutes the housing 10A, so that the reduction of the processing steps is attained.

Next, the card-shaped optical data link device according to the third embodiment of the present invention will be described with reference to FIGS. 25 to 29. The card-shaped optical data link device of the third embodiment belongs to the second type card-shaped optical data link device of the present invention.

Figure 25:
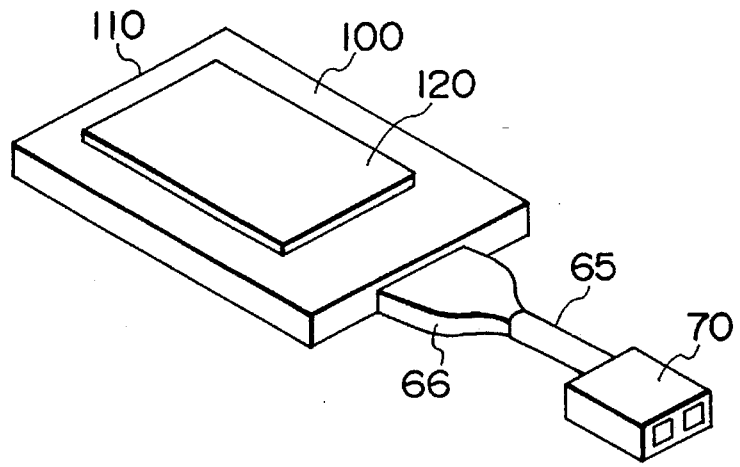
FIG. 25 is a perspective view showing a second type card-shaped optical data link device according to the third embodiment of the present invention.
Figure 26:
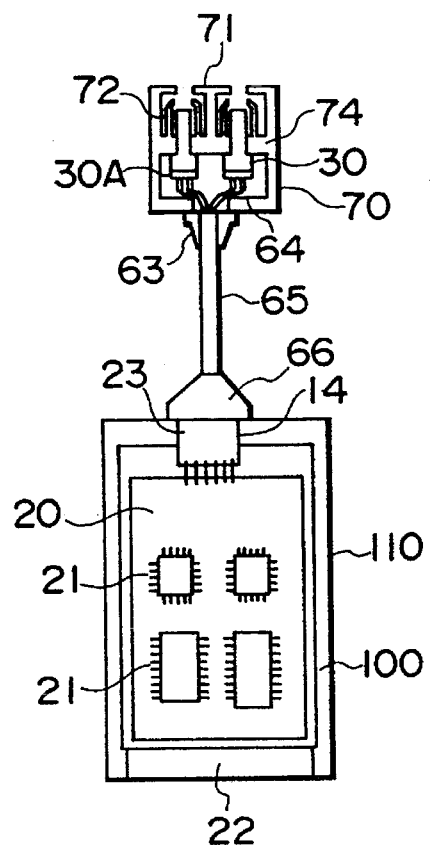
FIG. 26 is a top view showing the second type card-shaped optical data link device.
Figure 27:
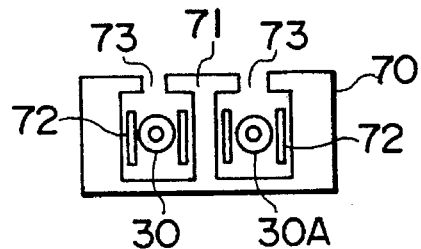
FIG. 27 is a side view showing an optical connector of the second type card-shaped optical data link device of the third embodiment.

FIG. 25 shows a perspective view of the card-shaped optical data link device and FIG. 26 shows a top view thereof. The card-shaped optical data link device of the third embodiment as shown in FIGS. 25 and 26 comprises a housing 100 which contains an electronic circuit board 20, an output socket 23, a cable 65 with a connector 66 to be connected to the output socket 23, and an optical connector 70 containing an optical transmission module 30 and an optical reception module 30A, to be connected to the cable 65.

The housing 100 comprises a flat rectangular frame 110 and metal panels (panel) 120 sandwiching the frame 110, which is formed thin in conformity with the type II communication card standardized by JEIDA. The frame 110, as shown in FIG. 26, is a flat rectangular frame with one open side and has an attaching space 14 at a center of a short side to fix the connector 66 of the cable 65. The frame 110 supports the electrical connector 22 at another short side which is the open end. The thin flat rectangular metal panels 120, as shown in FIG. 25, sandwich the frame 110 to efficiently protect and shield the electronic circuit board 20, the electrical connector 22, and the output socket 23. Accordingly, the housing 100 is formed in conformity with the type II communication card which has the length of 85.6±0.2 mm, the width of 54.0±0.1 mm, the coupling portion thickness of 3.3±0.1, and the body thickness of 5.0 mm or below.

In the third embodiment, the metal panels 120 efficiently protect and shield the electronic circuit board 20, the electric connector 22 and the output socket 23 but the metal panels 120 may protect and shield the whole portion or a part of the electronic circuit board 20, the electric connector 22, and the output socket 23. Further, the panels 120 may be formed with plastic or another material if the material shows the same functions and effects. Furthermore, in the third embodiment, the housing 100 is formed in conformity with the type II communication card but it may be formed in conformity with the type I communication card, which also shows the same functions and effects.

The electronic circuit board (electric signal processor) 20 is formed thin, flat rectangular. ICs with plurality of pins are mounted on the surface of the electronic circuit board 20 which is housed in the housing 100. The electric connector 22 standardized by JEIDA is fixed at the end of the electronic circuit board 20, located at the short side of the frame 110. The electric connector 22 has the same configuration as in the first embodiment and it is utilized in the same way as in the first embodiment. The output socket 23 located at the attaching space 14 of the frame 110 is connected to the middle of the short side end of the electronic circuit board 20. The electronic circuit board 20 has a function to process an electric signal when the electric connector 22 is connected to the external device such as a computer.

In this embodiment, the electronic circuit board 20 shown in FIG. 26 is used but it is not limited to this structure and shape if it shows the same functions and effects.

The optical transmission module 30, the optical reception module 30A, the transmission optical fiber 40, and the reception optical fiber 40A in the present embodiment are the same as those used in the first embodiment. The optical transmission connector plug 41 and the optical reception connector plug 41A to be connected to the optical connector 70 are also the same as those used in the first embodiment.

It should be noted that in this embodiment, the optical transmission and reception modules 30, 30A shown in FIG. 9 are used but they are not limited to this structure and shape if they have the same function. For example, an optical module shown in FIG. 29 may be used. Alternatively, the optical module having a cylindrical main body may be used. Further, it is apparent that the sleeve 32 shown in FIG. 29 can be replaced, e.g., with a sleeve having a slit in an extending direction.

It should also be noted that the transmission and reception optical fibers 40, 40A are used in the present embodiment but any kinds of transmission optical fibers may be used if the fiber has a function of transmitting light. The optical transmission and reception connector plugs 41, 41A are not limited to the MU-connector plugs but other kinds of optical transmission and reception connector plugs 41, 41A, e.g., FDDI-, SC-, FC-, and ST-connector plugs, may be used.

Figure 28:
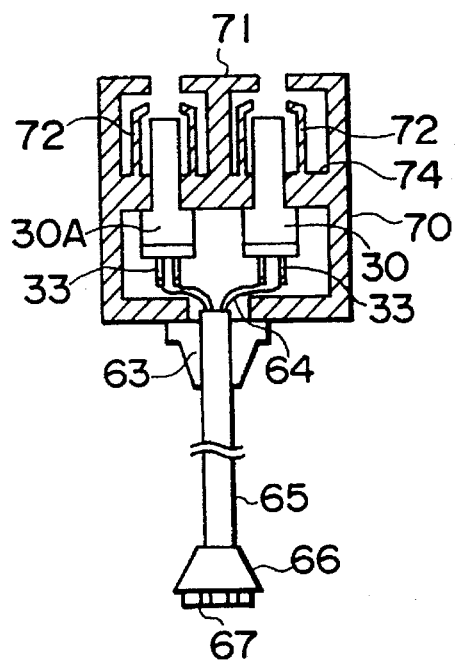
FIG. 28 is a top view showing the optical connector and a cable of the card-shaped optical data link device of the third embodiment.
Figure 29:
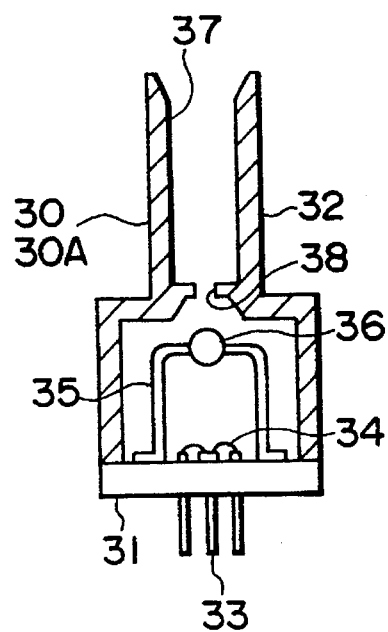
FIG. 29 is a sectional view showing another optical transmission module and optical reception module of the card-shaped optical data link device of the third embodiment.

The optical connector 70 made of plastic has a box shape with an open front side, as shown in FIGS. 25 to 28. The optical connector 70 holds the optical transmission module 30 and the optical reception module 30A horizontally, and the MU-optical transmission connector plug 41 and the MU-optical reception connector plug 41A are inserted into the optical connector 70. There is a partition plate 74 in the middle of the optical connector 70 to divide the internal space into two adaptor spaces. The partition plate 74 has a pair of holes to which the optical transmission and reception modules 30 and 30A are inserted. There is a division plate 71 integrally molded with the partition plate 74 to further divide the internal space of one adaptor space divided by the partition plate 74 into two adaptor spaces. There are also one pair of holding strips 72 projecting to the front side of the optical connector 70 in each adaptor space divided by the division plate 71 of the optical connector 70, as shown in FIG. 26 and FIG. 28. These two pairs of the holding strips 72 latch the optical connector plugs 41 and 41A. Cuts 73 are formed on the upper surface of the optical connector 70 from the front side to the back side. These cuts 73 contribute to making the thin optical connector and function to hold the protruding portion (tab) of the MU-optical transmission and reception connector plugs (note that connector plugs 41 and 41A shown in FIG. 40 which will be described later do not have a protrusion portion.)

In the present embodiment, the optical connector 70 has the cuts but the cuts are not required if the optical transmission connector plug 41 and the optical reception connector plug 41A do not have the protrusion portions or if the optical connector 70 does not have to be formed thin. The optical connector 70 may be changed in accordance with the kinds of the optical transmission and reception connector plugs 41 and 41A such as FDDI-, SC-, FC-, or ST-connector plugs. The thickness of the optical connector 70 may be formed 5 mm or above. This is because only the housing 100 containing the electric board 20 is inserted into, e.g., the card slot of the computer, so that the optical connector 70 does not have to be thin. For the same reason, the size of the optical transmission and reception modules 30, 30A located in the optical connector 70 is not limited.

The cable 65 has the connector 66 attached with pins 67. The pins 67 are connected to the output socket 23 electrically connected to the electronic circuit board 20. The cable 65 has a protective hood 63 at the opposite side of the connector 66. Lead pins 33 of the optical transmission and reception modules 30 and 30A are coupled to the cable 65 with lead wires 64. Thus, the cable 65 has a function to electrically couple the electronic circuit board 20 with the optical transmission and reception modules 30 and 30A in the optical connector 70.

It should be noted that the pins 67 are removable from the output socket 23 in the present embodiment but the pins 67 may be fixed to the output socket 23 so as not to be removed from the socket 23.

The housing 100 of the card-shaped optical data link device with the above-described configuration is inserted into the card slot 210 of the personal computer 200 as shown in FIG. 7, and the optical transmission and reception connector plugs 41 and 41A are fitted into the optical connector 70 when data are transmitted between the computer and the external device in optical communications.

When the data are transmitted from the computer to the external device in optical communications, an electric signal is sent from the computer 200 to the electronic circuit board 20 through the electric connector 22, and the electronic circuit board 20 processes the electric signal. The processed electric signal is sent to the optical transmission module 30 successively through the output socket 23, the pins 67 and the cable 65. Then, the optical device 34 such as an LED converts the electric signal into the optical signal, and the optical signal is transmitted to the external device through the transmission optical fiber 40.

On the other hand, when the data are received from the external device, an optical signal is sent from the external device to the optical reception module 30A through the reception optical fiber 40A. Then, the optical device 34 such as a pin photodiode of the optical reception module 30A converts the optical signal into the electric signal and the electric signal is sent to the electronic circuit board 20 successively through the cable 65, the connector 66, the pins 67 and the output socket 23. The electronic circuit board 20 processes the electric signal, and the processed electric signal is sent to the computer through the electric connector 22.

According to the above-described configuration of the card-shaped optical data link device, the housing 100 is formed thin in conformity with the type II communication card standardized by JEIDA, so that the existing card slot of the computer, for example, can be used to transmit and receive data in optical communications. Since the housing 100 and the optical connector 70 are formed separately, the optical connector 70 does not have to be formed thin. It may be formed 5 mm thick or above, and the existing optical transmission and reception connector plugs 41 and 41A such as FDDI-, SC-, FC-, or ST-connector plugs which have the thickness of 5 mm or above may be used.

Further, the frame 110 are sandwiched between the metal panels 120, so that the electronic circuit board 20, the electric connector 22, the output socket 23 and the pins 67 are efficiently protected and shield from the external environment. The precision sleeves 37 are formed at the sleeves 32 of the optical transmission module 30 and the optical reception module 30A, which largely suppress optical losses. Furthermore, the pairs of the holding stripes 72 latch the optical connector plugs 41 and 41A when they are inserted into the optical connector 70. Further, the optical connector 70 has the cuts 73 on the upper surface thereof from the front side to the back side, which makes the optical connector 70 thin.

Figure 30:
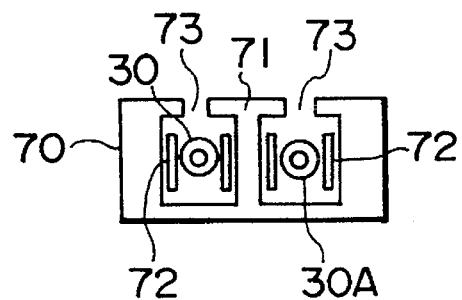
FIGS. 30 and 31 are views showing a second type card-shaped optical data link device according to the fourth embodiment.
Figure 31:
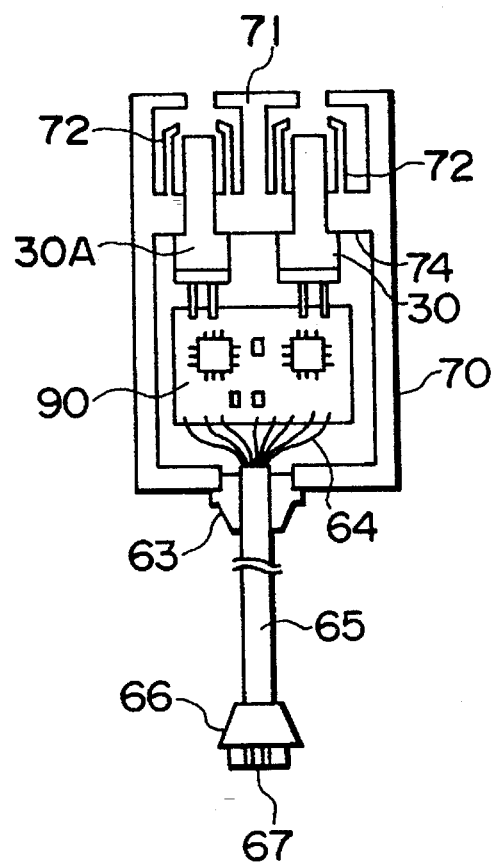

Next, the card-shaped optical data link device of the fourth embodiment according to the present invention will be described. The card-shaped optical data link device of the present embodiment belongs to the second type card-shaped optical data link device. FIG. 30 and FIG. 31 show an optical connector, an optical transmission module and an optical reception module of the second type card-shaped optical data link device of the present embodiment. The card-shaped optical data link device of the fourth embodiment is different from the optical data link of the third embodiment in that a small drive circuit board 90 for driving the optical transmission and reception modules 30 and 30A is included in the optical connector 70. Accordingly, the optical transmission and reception modules 30 and 30A, and the drive circuit board 90 constitute one optical data link device. The cable 65 is connected to the drive circuit board 90 with lead wires 64. The remaining portions of the card-shaped optical data link device are as same as in the third embodiment.

This optical data link device of the present embodiment is connected to the housing 100 as the pins 67 of the cable 65 is connected to the output socket 23. The optical transmission and reception connector plugs are inserted into the optical connector 70 to be optically coupled with the optical transmission and reception modules 30 and 30A.

The housing 100 comprising the electronic circuit board 20 of the card-shaped optical data link device with the above-described configuration is inserted into the card slot 210 of the personal computer as shown in FIG. 7 when data are transmitted between the computer and the external device in optical communications.

When the data are transmitted from the computer to the external device in optical communications, an electric signal is sent from the computer 200 to the electronic circuit board 20 through the electric connector 22, and the electronic circuit board 20 processes the electric signal. The processed electric signal is sent to the drive circuit board 90 successively through the pins 67, the output socket 23, and the cable 65. Then, the drive circuit board 90 drives the optical transmission module 30 and the optical device 34 such as an LED converts the electric signal into the optical signal, and the optical signal is transmitted to the external device through the transmission optical fiber 40.

On the other hand, when the data is received from the external device, an optical signal is sent from the external device to the optical reception module 30A through the reception optical fiber 40A. Then, the optical device 34 such as a pin photodiode of the optical reception module 30A converts the optical signal into the electric signal and the electric signal is sent to the electronic circuit board 20 successively through the cable 65, the connector 66, the pins 67 and the output socket 23. The electronic circuit board 20 processes the electric signal, and the processed electric signal is sent to the computer through the electric connector 22.

Figure 32:
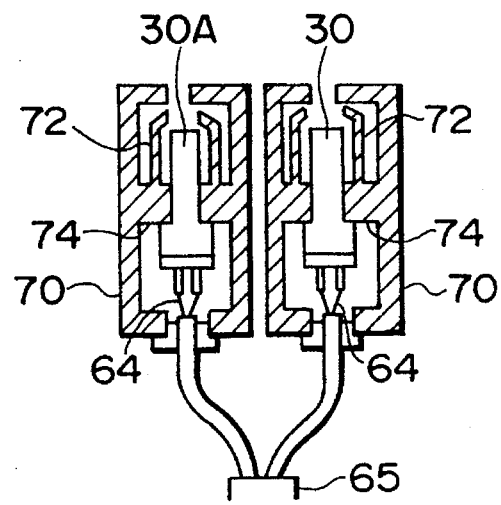
FIG. 32 is a top view showing an optical connector and optical transmission and reception modules of the second type card-shaped optical data link device according to the fifth embodiment.

Next, the card-shaped optical data link device of the fifth embodiment will be described, referring to FIG. 32. In FIG. 32, only the optical connector is shown because the remaining portions are the same as in the third embodiment.

The optical connector of the fifth embodiment is different from the optical connector of the third embodiment in that the optical connector 70 is spread into two parts, and the optical transmission module 30 and the optical reception module 30A are held in each part. Each module is connected to the cable 65 with lead wires 64.

Also in the present embodiment, the same function and effect are attained as in the above-described embodiments.

Next, the card-shaped optical data link device of the sixth embodiment, which belongs to the third type card-shaped optical data link device of the present invention will be described with reference to FIGS. 33 to 38.

Figure 33:
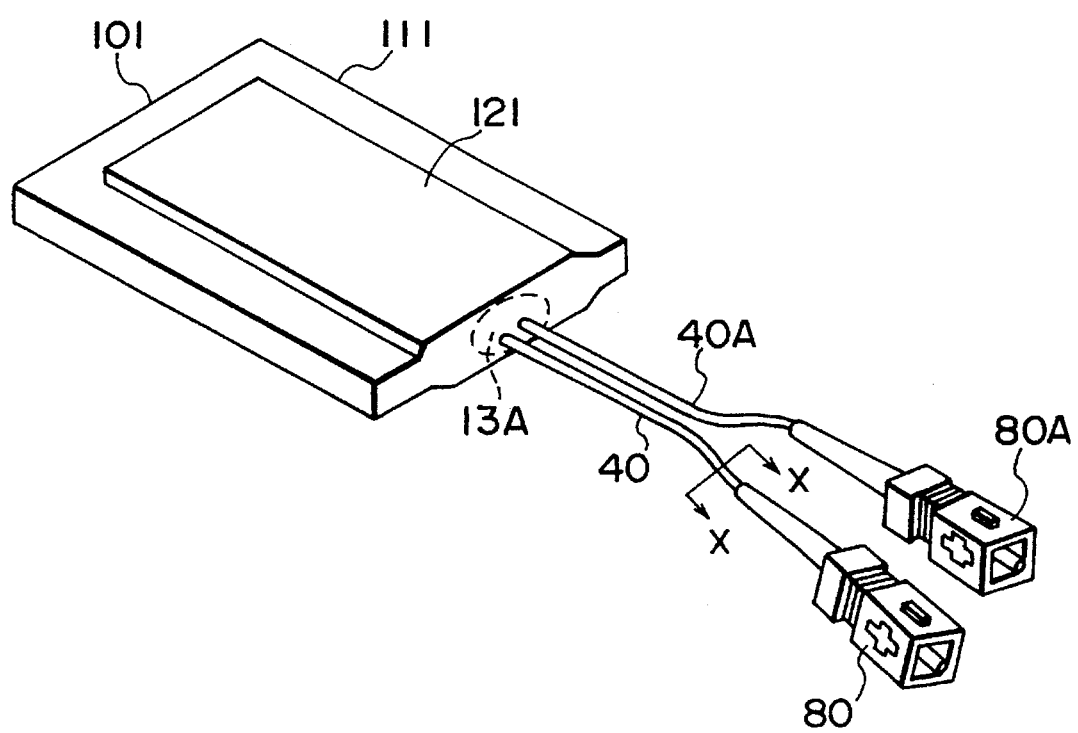
FIG. 33 is a perspective view showing a third type card-shaped optical data link device according to the sixth embodiment of the present invention.
Figure 37:
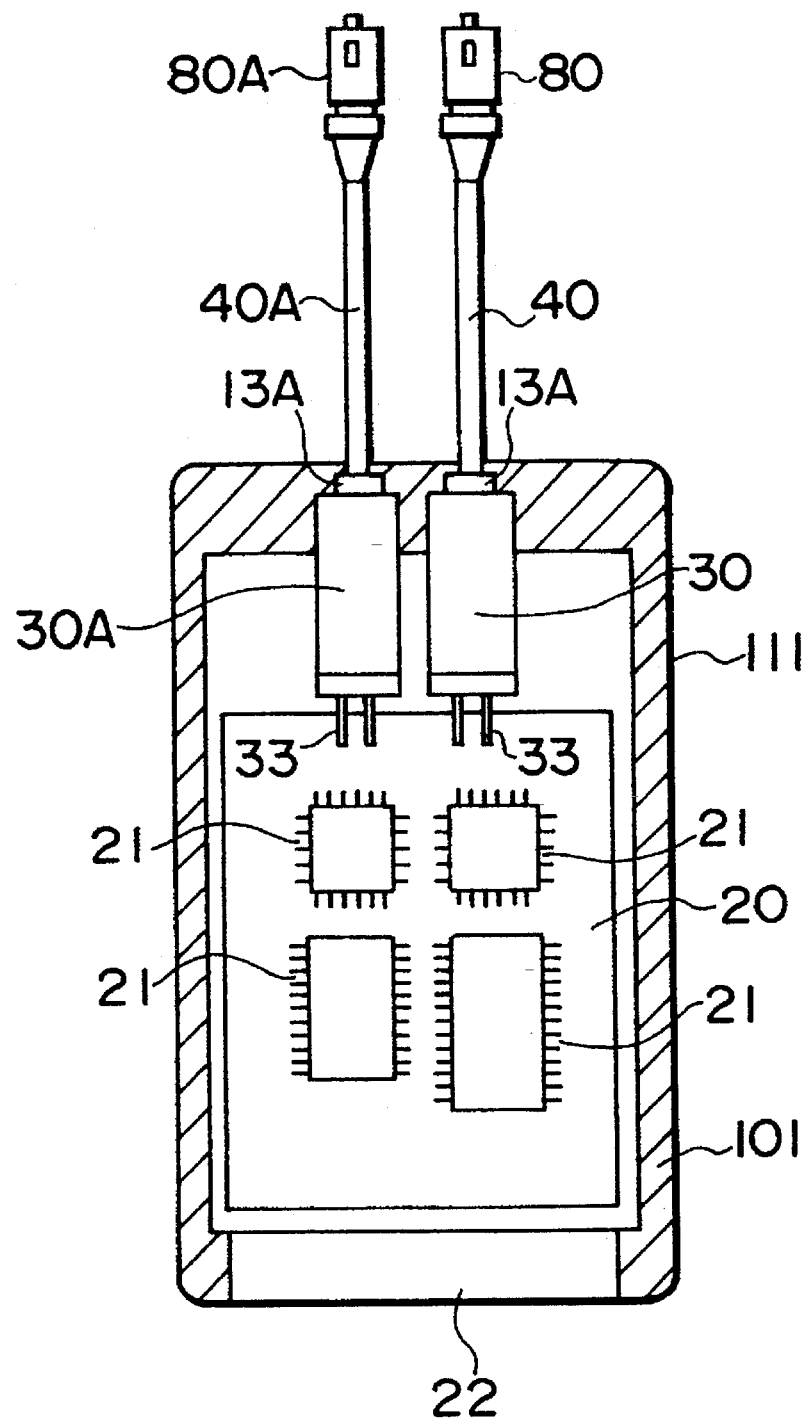
FIG. 37 is a tope view showing a third type card-shaped optical data link device.

FIG. 33 shows the perspective view of the card-shaped optical data link device of the sixth embodiment, and FIG. 37 shows its top view. As shown in FIG. 33 and FIG. 37, the card-shaped optical data link device comprises a housing 101 containing an electronic circuit board 20 and an optical transmission module 30 and an optical reception module 30A which are fitted into a pair of attaching holes 13A, a transmission optical fiber 40 and a reception optical fiber 40A connected to the optical transmission module 30 and the optical reception module 30A, and connectors 80 and 80A which are fitted on the ends of the transmission optical fiber 40 and the reception optical fiber 40A. Another optical fibers are coupled to the transmission and reception optical fibers 40 and 40A through the connectors 80 and 80A.

The housing 101 comprises a flat rectangular frame 111 and metal panels 121 sandwiching the frame 111. The housing 101 is formed thin in conformity with the type II communication card. The frame 111, as shown in FIGS. 33 and 37, is a flat rectangular frame with one open side and has a pair of attaching holes 13A at a center of a short side. The optical transmission module 30 and the optical reception module 30A are fitted into the attaching holes 13A shown as dotted line in FIG. 33, which form the pig-tail portion (connection). The pig-tail connection is disclosed in Japanese Utility Model Laid-Open No. HEI 1-136908 (136908/1989).

Figure 38:
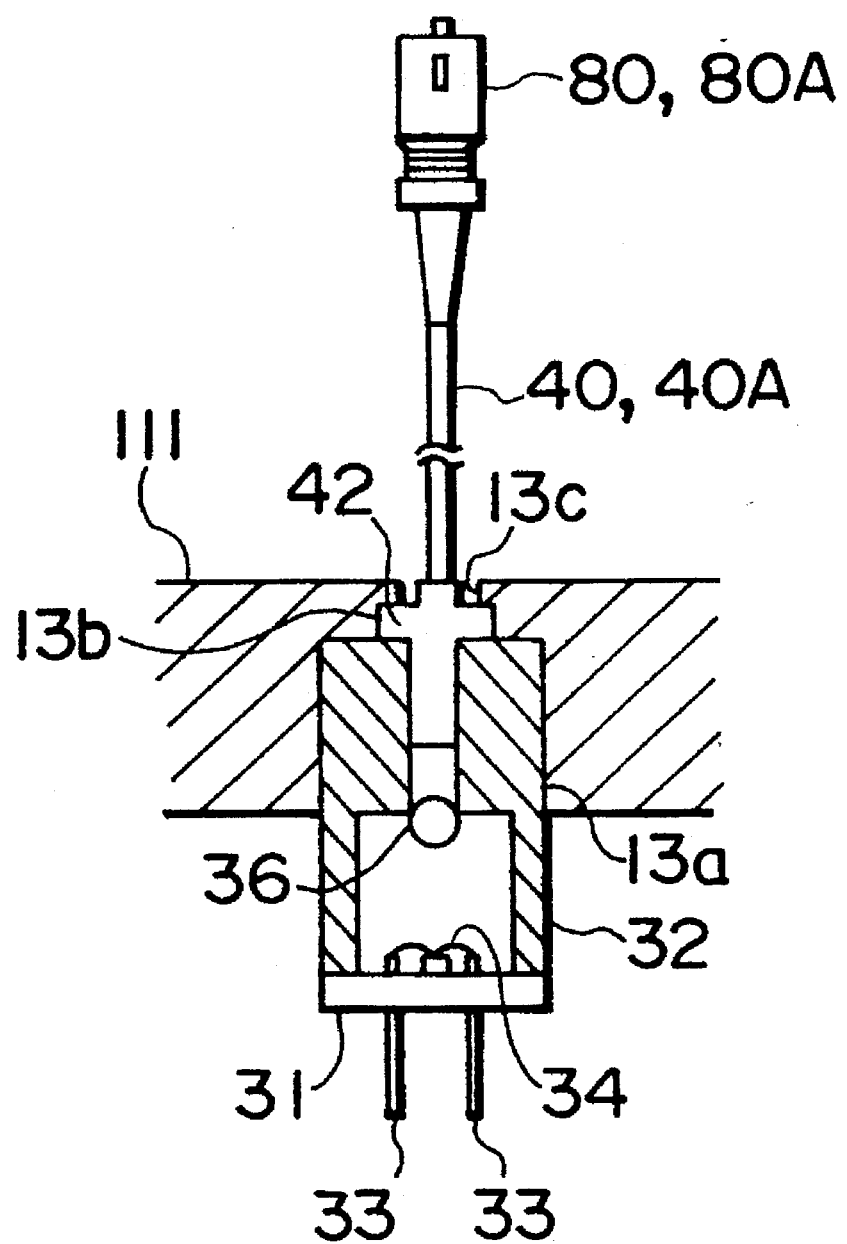
FIG. 38 is a sectional view showing the optical fiber being inserted into the optical module.

The attaching hole 13A, as shown in FIG. 38, has a largest diameter portion 13a to which the optical transmission module 30 or the optical reception module 30A is inserted, a large diameter portion 13b which is continuously formed with the largest diameter portion 13a and to which the ferrule 42 is inserted, and a small diameter portion 13c which is continuously formed with the large diameter portion 13b and which stops (holds) and positions the end portions of the ferrule 42. The remaining portions of the housing 101 are the same as in the first embodiment.

The electronic circuit board (electric signal processing means) 20 is formed thin, flat rectangular. ICs with pluralities of pins are mounted on the surface of the electronic circuit board 20 which is housed in the housing 101. The electric connector 22 is connected to one short side of the electronic circuit board 20.

Figure 34:
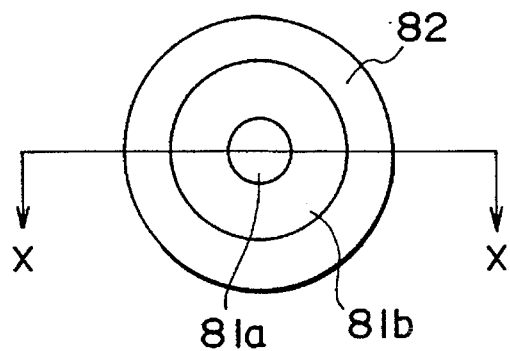
FIG. 34 is a sectional view of an optical fiber used in the third type card-shaped optical data link device.

In the same way as in the first embodiment shown in FIG. 7, the housing 101 of the card-shaped optical data link device is inserted into a card slot 210 of a computer 200 to transmit data between the computer 200 and external devices. The data is transmitted with the optical fibers 40 and 40A extending from the housing 101. FIG. 34 shows the cross section of the optical fiber 40 taken in lines X—X in FIG. 33. The optical fiber 40 has a core 81a and a cladding 81b surrounding the core 81a, and the core 81a and the cladding 81b are surrounded by a coating layer 82. The optical fiber 40A has the same configuration as the optical fiber 40.

Figure 35:
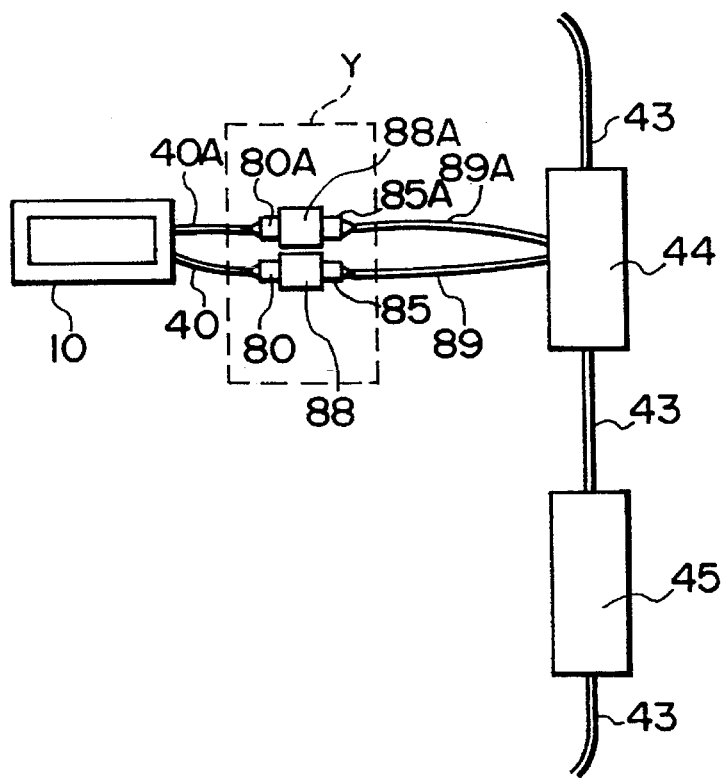
FIG. 35 is a view showing a card-shaped optical data link device connection.

FIG. 35 shows one way of using the card-shaped optical data link device in optical communications. In FIG. 35, another optical fiber 89 is optically coupled with the optical fiber 40 as the connector 80 fitted on the end of the optical fiber 40 and a connector 85 fitted on the end of the optical fiber 89 are inserted into an adaptor 88. Also, another optical fiber 89A is optically coupled with the optical fiber 40A as the connector 80A fitted on the end of the optical fiber 40A and a connector 85A fitted on the end of the optical fiber 89A are inserted into an adaptor 88A. Optical fibers 43 are used in room wiring. The optical fibers 89 and 89A are coupled to an optical branching device 44, and optical fibers 43 extend from the optical branching device 44 to the other optical branching device 45 and to another device (not shown).

Figure 36:
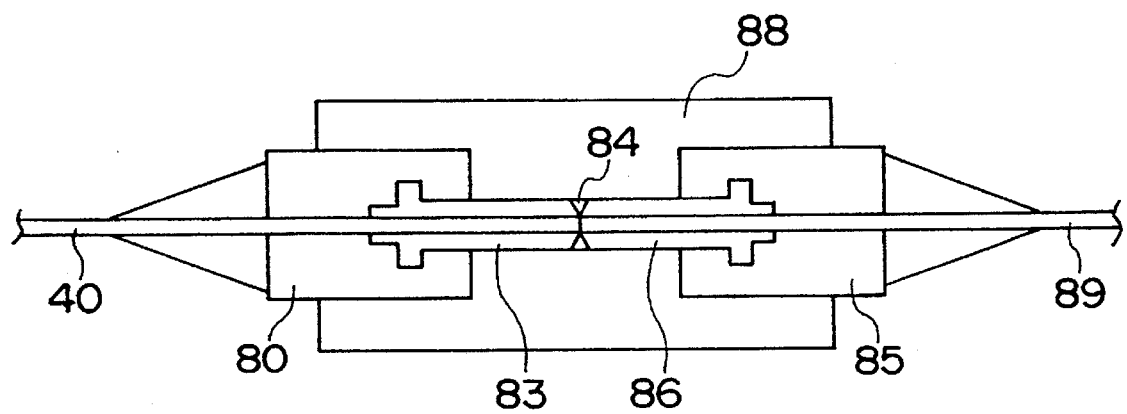
FIG. 36 is a sectional view showing an optical fiber of the third type card-shaped optical data link device being coupled to another optical fiber.

FIG. 36 shows the cross section of the coupling of the optical fiber 40 with the optical fiber 89. As shown in FIG. 36, the connector 80 fitted on the end of the optical fiber 40 has a ferrule 83 at its end to support the optical fiber 40. Also the other connector 85 fitted on the end of the optical fiber 89 has a ferrule 86 at its end to support the optical fiber 89. The coupling of the optical fiber 40 with the optical fiber 89 is made as the optical connectors 80 and 85 are inserted from both sides of the adaptor 88. There is a sleeve portion 84 in the adaptor 88 and this sleeve portion 84 limits the outer diameter of the ferrules 83 and 86. The ferrule 83 is faced to the ferrule 86 in the sleeve portion 84, and optical axes of the optical fibers 40 and 89 are aligned. Since the sleeve portion 84 is formed with high accuracy, the loss due to coupling is very low. In the same way as above, the optical fiber 40A is optically coupled with the optical fiber 89A.

The optical transmission module 30 utilized in the present embodiment is shown in FIG. 38. As shown in FIG. 38, a sleeve 32 with both ends open is cylindrical, and one side of the sleeve 32 has a larger inner diameter than the other side. The portion with the large inner diameter of the sleeve 32 is fixed on a backside of a substantially circular device package 31, and fitted into the attaching hole 13A of the housing 101. The optical transmission module 30 converts an electric signal sent from the electronic circuit board 20 into an optical signal and transmits the optical signal to the outside through the transmission optical fiber 40. There are plural lead pins 33 formed on the front side of the device package 31, and the lead pins 33 are electrically connected to the electronic circuit board 20 through wires (not shown). An LED for converting an electric signal into an optical signal, or an optical device 34 such as an LD is mounted on the center portion of the backside of the device package 31. There is a lens 36 for optically coupling the optical device 34 with the transmission optical fiber 40. When the ferrule 42 is inserted into the sleeve 32 of the optical reception module 30, the optical fiber 40 supported by the ferrule 42 receives light emitted from the optical device 34 through the lens 36. The remaining portions are the same as the optical transmission module 30 utilized in the first embodiment which is shown in FIG. 9.

The transmission optical fiber 40 is coated with a protective coating layer, and the cylindrical ferrule 42 is fitted on a front end of the optical fiber 40. When this ferrule 42 is inserted into the precision sleeve 32, the ferrule 42 prevents the imperfect alignment of the transmission optical fiber 40. The connector 80 is attached on the other end of the transmission optical fiber 40. Another optical fiber is coupled to the connector 80.

On the other hand, the optical reception module 30A has the same configuration as the optical transmission module 30 shown in FIG. 38 except that the optical device 34 is a pin photodiode for receiving light. When the ferrule 42 is inserted into the sleeve 32 of the optical reception module 30A, the optical device 34 receives light emerging from the optical fiber 40A supported by the ferrule 42.

As shown in FIG. 38, the reception optical fiber 40A is coated with a coating layer to be protected. The cylindrical ferrule 42 is fitted on the tip of the reception optical fiber 40A. When this ferrule 42 is inserted into the sleeve 32, the ferrule 42 prevents the imperfect alignment of the reception optical fiber 40A. The connector 80A is attached on the other end of the transmission optical fiber 40A. Another optical fiber is coupled to the connector 80A.

In the present embodiment, the connectors 80 and 80A are attached to the ends of the transmission optical fiber 40 and the reception optical fiber 40A but the connector plugs 41 and 41A shown in FIG. 10 may be attached to the optical fibers 40 and 40A, or the optical connectors 80 and 80A may be omitted.

The housing 101 of the card-shaped optical data link device with the above-described configuration is inserted into the card slot 210 of the personal computer as shown in FIG. 7, and other optical fibers are coupled to the transmission optical fiber 40 and the reception optical fiber 40A with the connectors 80 and 80A when data is transmitted between the computer and the external device in optical communications.

When data is transmitted from the computer to the external device in optical communications, an electric signal is sent from the computer 200 to the electronic circuit board 20 through the electric connector 22, and the electronic circuit board 20 processes the electric signal. The processed electric signal is sent to the optical transmission module 30. Then, the optical device 34 such as an LED converts the electric signal into the optical signal, and the optical signal is transmitted to the external device such as another computer through the transmission optical fiber 40.

On the other hand, when the data are received from the external device, an optical signal is sent from the external device to the optical transmission module 30A through the reception optical fiber 40A. Then, the optical device 34 such as a pin photodiode of the optical reception module 30A converts the optical signal into the electric signal and the electric signal is sent to the electronic circuit board 20. The electronic circuit board 20 processes the electric signal, and the processed electric signal is sent to the computer through the electric connector 22.

According to the above-described configuration of the card-shaped optical data link device, the housing 101 is formed thin in conformity with the type II communication card standardized by JEIDA, so that the existing card slot of the computer can be used to transmit and receive data in optical communication. Further, the end of the ferrule 42 is fitted hard into the small-diameter portion 13c of the attaching hole 13A, so that a presser for fixing the ferrule 42 is not required and the reduction of the number of parts, the improvement of the work efficiency upon the installation and the cost reduction are attained. The frame 111 is sandwiched between the metal panels 121, so that the electronic circuit board 20, the electric connector 22, the optical transmission module 30 and the optical reception module 30A are efficiently protected and shielded from the external environment. The precision sleeves 37 are formed at the sleeves 32 of the optical transmission module 30 and the optical reception module 30A, which largely suppress optical losses.

The existing card slot of the computer or others can be used to transmit and receive data in optical communications with the card-shaped optical data link device in the present embodiment.

Figure 39:
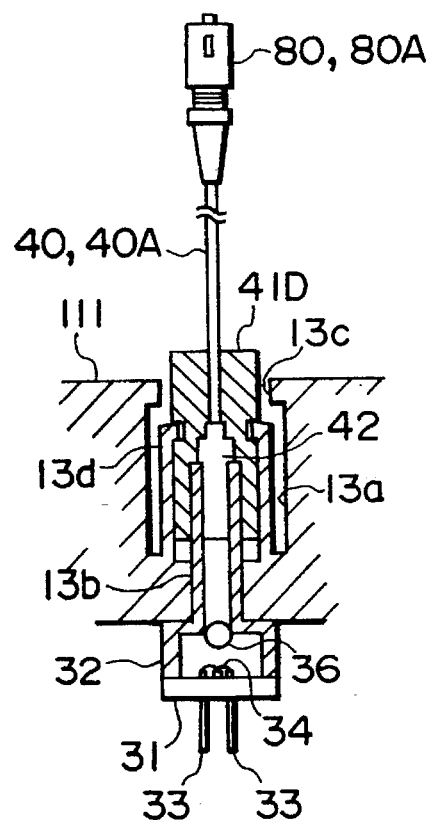
FIG. 39 is a sectional view showing an optical connector plug and an optical module of the third type card-shaped optical data link device according to the seventh embodiment.
Figure 40:
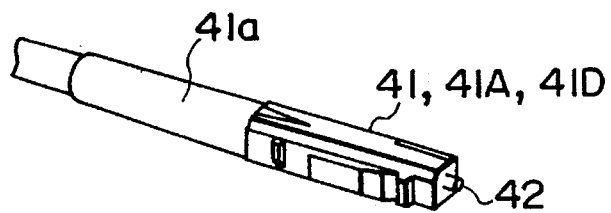
FIG. 40 is a perspective showing another optical connector plug.

The card-shaped optical data link device of the seventh embodiment will be described with reference to FIG. 39 and FIG. 40. The card-shaped optical data link device of the present embodiment belongs to the third type card-shaped optical data link device. The card-shaped optical data link device of the present embodiment is different from the card-shaped optical data link device of the sixth embodiment in that, as shown in FIG. 39, a pair of holding stripes 13d are formed in each attaching hole 13A. The holding stripes 13d hold an MU-optical connector plug 41D supporting a transmission optical fiber 40 or a reception optical fiber 40A as shown in FIG. 40. The MU-optical connector plug 41D has no tab.

The optical transmission module 30 and the optical reception module 30A utilized in this embodiment is the same as the ones used in the first embodiment, shown in FIG. 9.

The attaching hole 13A, as shown in FIG. 39, has a small diameter portion 13b to which the optical transmission module 30 or the optical reception module 30A are inserted and which is provided on the short side of the frame 111, a largest diameter portion 13a which is continuously formed with the small diameter portion 13b and to which the sleeve 32 is inserted, and a large diameter portion 13c which is continuously formed with the largest diameter portion 13a. The L-shaped pair of holding stripes 13d for holding the MU-optical connector plug 41D without a tab are formed at the largest diameter portion 13a.

The MU-optical connector plug 41D is formed 3.75 mm in thickness and the transmission optical fiber 40 or the reception optical fiber 40A is placed at one end of the MU-optical connector plug 41D. As shown in FIG. 40, a rubber hood 41a is placed on the optical fiber 40 or 40A. The MU-optical connector plug 41D is receptacle type, which is superior in small size, light weight, operability, high reliability, low cost and high performance. The MU-optical transmission connector plug 41D without a tab is used. This is because (1) once the MU-optical transmission connector plug 41D is inserted into the attaching hole 13A, it is never removed therefrom unless some equipment is used because of the tab, and (2) the MU-optical transmission connector plug 41D is able to be inserted into the housing 101 which is formed in conformity with the type II communication card standardized by JEIDA.

The existing card slot of a computer or others can be used to transmit and receive data in optical communications with the card-shaped optical data link device in the present embodiment. The card-shaped optical data link device is directly connected to an optical fiber plug socket placed on a floor.

In the above first to seventh embodiments, the optical communication means is a computer but it is apparent that another devices can be used if they can be used in optical communications, for example, facsimiles, measuring apparatus, optical devices, electrical communication device, etc.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

The basic Japanese Application Nos. 18573/1994 and 18566/1994 both filed on Feb. 15, 1994 are hereby incorporated by reference.

What is claimed is:

1. A card-shaped optical data link device, comprising:
   an electric connector for receiving and transmitting an electric signal from and to an external environment;
   an electric signal processor electrically connected to said electric connector;
   an optical transmission module electrically connected to said electric signal processor, for converting the electric signal received from said electric signal processor into an optical signal;

an optical reception module electrically connected to said electric signal processor, for converting an optical signal into an electric signal;

an optical connector for supporting said optical transmission module and said optical reception module;

a receiving portion formed in said optical connector for receiving an optical plug having a guide projection extending in a direction along which the optical plug is inserted into the receiving portion, said receiving portion having a cavity with an opening for receiving the optical plug, and said cavity being in communication with the outside of said receiving portion through a slot for receiving the guide projection, said slot having an opening on an edge of said opening of said cavity and extending in the insertion direction of said optical plug;

a frame accommodating said electric connector and said electric signal processor, said optical transmission module and said optical reception module, said optical connector being incorporated into said frame and located at a position opposing said electric connector through said electric signal processor; and a pair of panels for sandwiching said frame and forming an envelope with said frame, said envelope housing said electric connector, said electric signal processor, said optical transmission module, said optical reception module and said optical connector;

said guide projection of said optical plug being directly faced to at least one of said panels, when said optical plug is inserted into said receiving portion.

2. A card-shaped optical data link device according to claim 1, wherein said optical connector has a division plate to divide an internal space of said optical connector into two holding spaces, a hole in each holding space to which one of said optical transmission module and said optical reception module is inserted, and a pair of holding stripes in each holding space for holding an optical coupling of an optical fiber to be inserted into said holding space with one of said optical transmission module and said optical reception module.

3. A card-shaped optical data link device according to claim 1, wherein said frame is an open case having two adapting spaces at opposing sides, for said optical connector and said electric connector.

4. A card-shaped optical data link device according to claim 1, wherein a thickness of said optical connector is substantially equal to a thickness of said frame.

5. A card-shaped optical data link device according to claim 1, wherein said frame and said optical connector are integrally formed from one material.

6. A card-shaped optical data link device according to claim 5, wherein said material is an engineering plastic.

7. A card-shaped optical data link device according to claim 1, wherein said frame is made of plastic.

8. A card-shaped optical data link device according to claim 1, wherein said panels are made of metal.

9. A card-shaped optical data link device according to claim 1, wherein said optical connector is made of metal.

10. A card-shaped optical data link device according to claim 1, wherein said optical connector is made of plastic.

11. A card-shaped optical data link device according to claim 1, wherein one of said panels has a bulge.

12. A card-shaped optical data link device according to claim 1, wherein said optical transmission module and said optical reception module are connected to said electric connector with wires.

13. A card-shaped optical data link device according to claim 1, wherein said electric signal processor, said optical transmission module and said reception module are located in said envelope formed by said frame and said panels, whereby said electric signal processor, said optical transmission module and said reception module are not exposed to an outside of said envelope.

* * * * *